US012461206B2

(12) United States Patent
Droz et al.

(10) Patent No.: US 12,461,206 B2
(45) Date of Patent: *Nov. 4, 2025

(54) LIDAR RECEIVER USING A WAVEGUIDE AND AN APERTURE

(71) Applicant: Waymo LLC, Mountain View, CA (US)

(72) Inventors: Pierre-Yves Droz, Los Altos, CA (US); David Neil Hutchison, Santa Clara, CA (US); Ralph Hamilton Shepard, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 18/317,171

(22) Filed: May 15, 2023

(65) Prior Publication Data

US 2023/0280450 A1 Sep. 7, 2023

Related U.S. Application Data

(63) Continuation of application No. 16/895,191, filed on Jun. 8, 2020, now Pat. No. 11,686,823, which is a
(Continued)

(51) Int. Cl.
*G01C 3/08* (2006.01)
*F21V 8/00* (2006.01)
(Continued)

(52) U.S. Cl.
CPC .......... *G01S 7/4816* (2013.01); *G01S 7/4863* (2013.01); *G01S 17/42* (2013.01); *G02B 6/003* (2013.01);
(Continued)

(58) Field of Classification Search
CPC .. G01S 17/4816; G01S 17/4863; G01S 17/42; G02B 5/003; G02B 6/0055; G02B 6/4214; G02B 6/4298
See application file for complete search history.

(56) References Cited

U.S. PATENT DOCUMENTS 3,899,145 A 8/1975 Stephenson
4,544,255 A 10/1985 Utagawa
(Continued)

FOREIGN PATENT DOCUMENTS

| EP | 3438699 A1 | 2/2019 |
| WO | 03098263 A2 | 11/2003 |
| WO | 2017112416 A1 | 6/2017 |

OTHER PUBLICATIONS

Extended European Search Report for PCT/US2018/041871, dated Apr. 22, 2021.
(Continued)

*Primary Examiner* — Mark Hellner
(74) *Attorney, Agent, or Firm* — MCDONNELL BOEHNEN HULBERT & BERGHOFF LLP

(57) ABSTRACT

The present disclosure relates to limitation of noise on light detectors using an aperture. One example implementation includes a system. The system includes a lens disposed relative to a scene. The lens focuses light from the scene. The system also includes an opaque material that defines an aperture. The system also includes a waveguide having a first side that receives light focused by the lens and transmitted through the aperture. The waveguide guides the received light toward a second side of the waveguide opposite to the first side. The waveguide has a third side extending between the first side and the second side. The system also includes a mirror that reflects the guided light toward the third side of the waveguide. The system also
(Continued)

includes an array of light detectors that detects the reflected light propagating out of the third side.

20 Claims, 10 Drawing Sheets

Related U.S. Application Data continuation of application No. 15/665,796, filed on Aug. 1, 2017, now Pat. No. 10,698,088.

(51) Int. Cl.
- *G01S 7/481* (2006.01)
- *G01S 7/4863* (2020.01)
- *G01S 17/42* (2006.01)
- *G02B 6/42* (2006.01)

(52) U.S. Cl.
CPC .......... *G02B 6/0055* (2013.01); *G02B 6/4214* (2013.01); *G02B 6/4298* (2013.01)

(56) References Cited

U.S. PATENT DOCUMENTS

| | | | |
|---|---|---|---|
| 5,159,412 A * | 10/1992 | Willenborg | G01N 21/55 250/559.07 |
| 5,391,869 A | 2/1995 | Ade et al. | |
| 6,507,441 B1 * | 1/2003 | Eisenberg | G02B 3/0062 359/627 |
| 6,584,052 B1 | 6/2003 | Phillips et al. | |
| 7,995,875 B2 | 8/2011 | Yasuda et al. | |
| 8,190,030 B2 | 5/2012 | Leclair et al. | |
| 9,285,464 B2 | 3/2016 | Pennecot et al. | |
| 9,360,554 B2 | 6/2016 | Retterath et al. | |
| 9,405,066 B2 | 8/2016 | Mahgerefteh et al. | |
| 9,575,341 B2 | 2/2017 | Heck et al. | |
| 10,267,970 B2 | 4/2019 | Jones, Jr. et al. | |
| 10,502,618 B2 | 12/2019 | Droz et al. | |
| 10,698,088 B2 * | 6/2020 | Droz | G02B 6/0055 |
| 11,686,823 B2 * | 6/2023 | Droz | G01S 7/4816 356/4.01 |
| 2002/0009262 A1 | 1/2002 | Kasama et al. | |
| 2003/0010904 A1 * | 1/2003 | Luo | G02B 6/4214 250/227.11 |
| 2004/0178329 A1 | 9/2004 | Kare et al. | |
| 2004/0184502 A1 | 9/2004 | Miyachi et al. | |
| 2004/0218869 A1 | 11/2004 | Takahashi | |
| 2005/0141808 A1 | 6/2005 | Cheben et al. | |
| 2009/0147239 A1 | 6/2009 | Zhu et al. | |
| 2011/0136063 A1 | 6/2011 | Nottola et al. | |
| 2014/0168631 A1 | 6/2014 | Haslim et al. | |
| 2015/0185313 A1 | 7/2015 | Zhu | |
| 2016/0154165 A1 | 6/2016 | Grot et al. | |
| 2016/0259038 A1 | 9/2016 | Retterath et al. | |
| 2016/0363669 A1 * | 12/2016 | Liu | G01S 7/4815 |
| 2017/0223249 A1 | 8/2017 | Tillotson et al. | |
| 2017/0370676 A1 | 12/2017 | Volfson et al. | |
| 2018/0045886 A1 | 2/2018 | Demaray | |
| 2018/0149815 A1 | 5/2018 | Heroux et al. | |
| 2018/0239096 A1 | 8/2018 | Houbertz et al. | |
| 2018/0335628 A1 | 11/2018 | Hung et al. | |
| 2018/0356502 A1 * | 12/2018 | Hinderling | G01S 7/4818 |
| 2019/0017938 A1 | 1/2019 | Holzapfel et al. | |
| 2019/0227147 A1 | 7/2019 | Lin et al. | |

OTHER PUBLICATIONS

International Search Report and Written Opinion for PCT/US2018/041871, dated Nov. 27, 2018.

Jurgen Van Erps, Lawrence Bogaert, Bart Volckaerts, Christof Debaes, Hugo Thienpont, "Prototyping micro-optical components with integrated out-of-plane coupling structures using deep lithography with protons," Proc. SPIE 6185, Micro-Optics, VCSELs, and Photonic Interconnects II: Fabrication, Packaging, and Integration, 618504 (Apr. 21, 2006).

L.G. Kazovsky, Optical Fiber Communication Systems, Post & Telecom Press, 1999, pp. 4-5.

* cited by examiner

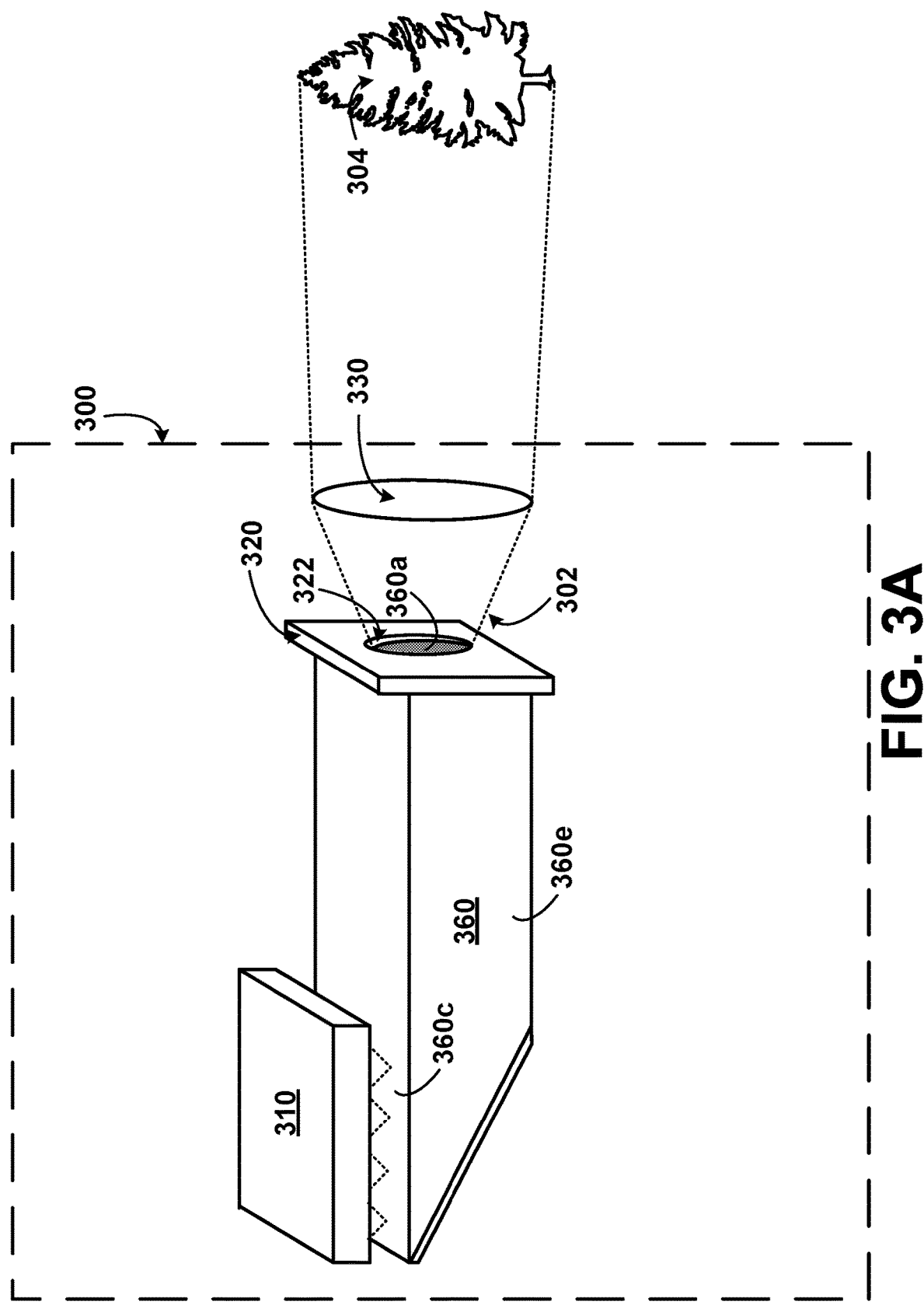

ns a scene. The LIDAR device also includes a LIDAR receiver that receives light reflected by one or more objects within the scene. The LIDAR receiver includes a lens that focuses light from the scene. The LIDAR receiver also includes an opaque material that defines an aperture. The LIDAR receiver also includes a waveguide having a first side that receives light focused by the lens and transmitted through the aperture. The waveguide guides the received light toward a second side of the waveguide opposite to the first side. The waveguide has a third side extending between the first side and the second side. The LIDAR receiver also includes a mirror disposed along a path of the guided light. The mirror reflects the guided light toward the third side of the waveguide. The LIDAR receiver also includes an array of light detectors that detects the light reflected by the mirror and propagating out of the third side of the waveguide.

LIDAR RECEIVER USING A WAVEGUIDE AND AN APERTURE

CROSS-REFERENCE TO RELATED APPLICATIONS

This application is a continuation of U.S. patent application Ser. No. 16/895,191, filed Jun. 8, 2020, which is a continuation of U.S. patent application Ser. No. 15/665,796, filed Aug. 1, 2017. The foregoing applications are incorporated herein by reference.

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, corresponding to an intensity of the light). Many types of such devices are fabricated out of semiconducting materials, such as silicon. In order to detect light over a substantial geometric area, multiple light detectors can be arranged into arrays connected in parallel. These arrays are sometimes referred to as silicon photomultipliers (SiPMs) or multi-pixel photon counters (MPPCs).

Some of the above arrangements are sensitive to relatively low intensities of light, thereby enhancing their detection qualities. However, this can lead to the above arrangements also being disproportionately susceptible to adverse background effects (e.g., extraneous light from outside sources could affect a measurement by the light detectors).

SUMMARY

In one example, a system includes a lens disposed relative to a scene and configured to focus light from the scene. The system also includes an opaque material that defines an aperture. The system also includes a waveguide having a first side that receives light focused by the lens and transmitted through the aperture. The waveguide guides the received light toward a second side of the waveguide opposite to the first side. The waveguide has a third side extending between the first side and the second side. The system also includes a mirror disposed along a propagation path of the guided light. The mirror reflects the guided light toward the third side of the waveguide. The system also includes an array of light detectors that detects the reflected light propagating out of the third side of the waveguide.

In another example, a method involves focusing, via a lens disposed relative to a scene, light from the scene. The method also involves transmitting the focused light through an aperture defined within an opaque material. The method also involves receiving, at a first side of a waveguide, the focused light transmitted through the aperture. The method also involves guiding, by the waveguide, the received light toward a second side of the waveguide. The method also involves reflecting, via a mirror, the guided light toward a third side of the waveguide. The third side extends between the first side and the second side. The method also involves detecting, at an array of light detectors, the reflected light propagating out of the third side of the waveguide.

In yet another example, a light detection and ranging (LIDAR) device includes a LIDAR transmitter that illumi- In still another example, a system comprises means for focusing, via a lens disposed relative to a scene, light from the scene. The system also comprises means for transmitting the focused light through an aperture defined within an opaque material. The system also comprises means for receiving, at a first side of a waveguide, the focused light transmitted through the aperture. The system also comprises means for guiding, by the waveguide, the received light toward a second side of the waveguide. The system also comprises means for reflecting, via a mirror, the guided light toward a third side of the waveguide. The third side extends between the first side and the second side. The system also comprises means for detecting, at an array of light detectors, the reflected light propagating out of the third side of the waveguide.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3A is an illustration of a noise limiting system that includes an aperture and a waveguide, according to example embodiments.

DETAILED DESCRIPTION

Figure 1A:
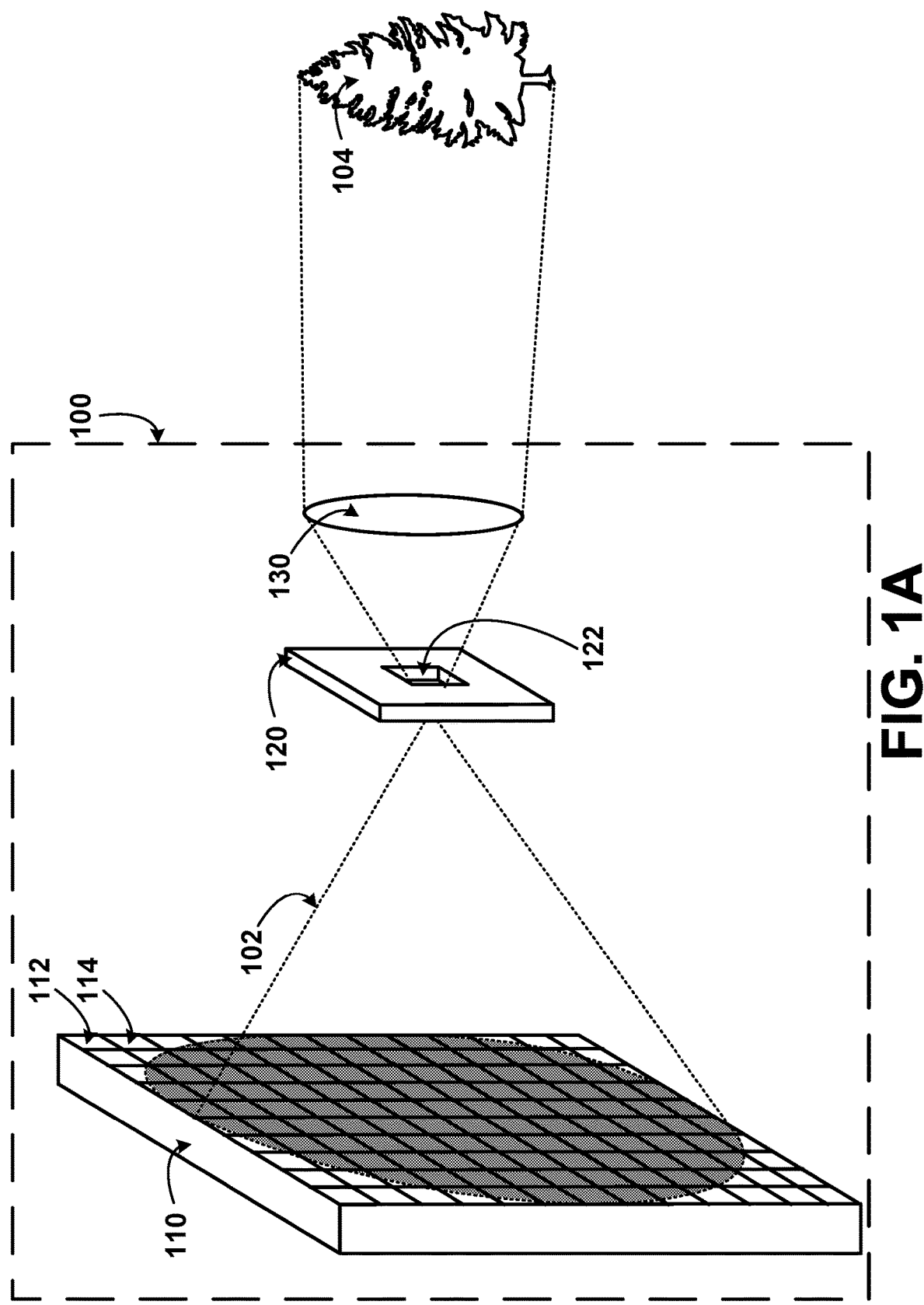
FIG. 1A is an illustration of a noise limiting system that includes an aperture, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. OVERVIEW

Example implementations may relate to devices, systems, and methods for reducing background light imparted onto an array of light detectors. The light detectors in the array may be sensing light from a scene. For example, the light detectors may be a sensing component of a light detection and ranging (LIDAR) device.

One example system includes a lens. The lens may be used to focus light from a scene. However, the lens may also focus background light not intended to be observed by the system (e.g., sunlight). In order to selectively filter the light (i.e., separate background light from light corresponding to information within the scene), an opaque material (e.g., selectively etched metal, a glass substrate partially covered by a mask, etc.) may be placed behind the lens. The opaque material could be shaped as a slab, a sheet, or various other shapes in a variety of embodiments. Within the opaque material, an aperture may be defined. With this arrangement, a portion of, or the entirety of, the light focused by the lens could be selected for transmission through the aperture.

In the direction of propagation of the light transmitted through the aperture, the system may include a waveguide having a first side (e.g., adjacent to the aperture, etc.) and a second side opposite to the first side. The system may also include an array of light detectors (e.g., SPADs) disposed on or otherwise adjacent to a third side of the waveguide. For example, the third side may extend from the first side to the second side along a guiding direction in which the waveguide guides propagation of light therein toward the second side. Further, the array of light detectors may be positioned adjacent to the third side to detect light that propagates through the third side of the waveguide.

By way of example, the system may include a mirror along a propagation path of the guided light propagating inside the waveguide. Further, the mirror may be tilted toward the third side of the waveguide. For instance, the second side of the waveguide can be tilted (e.g., slanted) toward the third side, and the mirror may be disposed along the second side (e.g., reflective material coating applied to the second side). Thus, for instance, the mirror may reflect the guided light (or a portion thereof) toward a particular region of the third side adjacent to the array of light detectors, and the reflected light may propagate through the particular region toward the array of light detectors.

Because the light from the aperture is guided along a length of the waveguide, the number of light detectors able to fit into a detection area (e.g., adjacent to the third side) can be larger than could fit in a cross-sectional area of the aperture. This may be due to the light being more tightly focused, and thus have a smaller cross-sectional area, at the aperture than along the particular region of the third side of the waveguide adjacent to the array of light detectors.

Other example implementations are possible as well and are described in greater detail within example embodiments herein.

II. EXAMPLE SYSTEMS AND DEVICES

FIG. 1A is an illustration of a noise limiting system 100 that includes an aperture, according to example embodiments. As shown, system 100 includes an array 110 of light detectors (exemplified by detectors 112 and 114), an aperture 122 defined within an opaque material 120, and a lens 130. System 100 may measure light 102 reflected or scattered by an object 104 within a scene. Light 102 may also come, at least partially, from background sources. In some examples, system 100 may be included in a light detection and ranging (LIDAR) device. For example, the LIDAR device may be used for navigation of an autonomous vehicle. Further, in some embodiments, system 100, or portions thereof, may be contained within an area that is unexposed to exterior light other than through lens 130. This may reduce an amount of ambient light (which may affect measurements) reaching the detectors in array 110.

Array 110 includes an arrangement of light detectors, exemplified by detectors 112 and 114. In various embodiments, array 110 may have different shapes. As shown, array 110 has a rectangular shape. However, in other embodiments, array 110 may be circular or may have a different shape. The size of array 110 may be selected according to an expected cross-sectional area of light 110 diverging from aperture 122. For example, the size of array 110 may be based on the distance between array 110 and aperture 122, dimensions of aperture 122, optical characteristics of lens 130, among other factors. In some embodiments, array 110 may be movable. For example, the location of array 110 may be adjustable so as to be closer to, or further from, aperture 122. To that end, for instance, array 110 could be mounted on an electrical stage capable of translating in one, two, or three dimensions.

Further, in some implementations, array 110 may provide one or more outputs to a computing device or logic circuitry. For example, a microprocessor-equipped computing device may receive electrical signals from array 110 which indicate an intensity of light 102 incident on array 110. The computing device may then use the electrical signals to determine information about object 104 (e.g., distance of object 104 from aperture 122, etc.). In some embodiments, some or all of the light detectors within array 110 may be interconnected with one another in parallel. To that end, for example, array 110 may be a SiPM or an MPPC, depending on the particular arrangement and type of the light detectors within array 110. By connecting the light detectors in a parallel circuit configuration, for instance, the outputs from the light detectors can be combined to effectively increase a detection area in which a photon in light 102 can be detected (e.g., shaded region of array 110 shown in FIG. 1A).

Light detectors 112, 114, etc., may include various types of light detectors. In one example, detectors 112, 114, etc., include SPADs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In another example, light detectors 112, 114, etc., may include linear-mode avalanche photodiodes (APDs). In some instances, APDs or SPADs may be biased above an avalanche breakdown voltage. Such a biasing condition may create a positive feedback loop having a loop gain that is greater than one. Further, SPADs biased above the threshold avalanche breakdown voltage may be single photon sensitive. In other examples, light detectors 112, 114, etc., may include photoresistors, charge-coupled devices (CCDs), photovoltaic cells, and/or any other type of light detector.

In some implementations, array 110 may include more than one type of light detector across the array. For example, array 110 can be configured to detect multiple predefined wavelengths of light 102. To that end, for instance, array 110 may comprise some SPADs that are sensitive to one range of wavelengths and other SPADs that are sensitive to a different range of wavelengths. In some embodiments, light detectors 110 may be sensitive to wavelengths between 400 nm and 1.6 µm (visible and/or infrared wavelengths). Further, light detectors 110 may have various sizes and shapes within a given embodiment or across various embodiments. In some embodiments, light detectors 112, 114, etc., may include SPADs that have package sizes that are 1%, 0.1%, or 0.01% of the area of array 110.

Opaque material 120 may block a portion of light 102 from the scene (e.g., background light) that is focused by the lens 130 from being transmitted to array 110. For example, opaque material 120 may be configured to block certain background light that could adversely affect the accuracy of a measurement performed by array 110. Alternatively or additionally, opaque material 120 may block light in the wavelength range detectable by detectors 112, 114, etc. In one example, opaque material 120 may block transmission by absorbing a portion of incident light. In another example, opaque material 120 may block transmission by reflecting a portion of incident light. A non-exhaustive list of example implementations of opaque material 120 includes an etched metal, a polymer substrate, a biaxially-oriented polyethylene terephthalate (BoPET) sheet, or a glass overlaid with an opaque mask, among other possibilities. In some examples, opaque material 120, and therefore aperture 122, may be positioned at or near a focal plane of lens 130.

Aperture 122 provides a port within opaque material 120 through which light 102 may be transmitted. Aperture 122 may be defined within opaque material 120 in a variety of ways. In one example, opaque material 120 (e.g., metal, etc.) may be etched to define aperture 122. In another example, opaque material 120 may be configured as a glass substrate overlaid with a mask, and the mask may include a gap that defines aperture 122 (e.g., via photolithography, etc.). In various embodiments, aperture 122 may be partially or wholly transparent, at least to wavelengths of light that are detectable by light detectors 112, 114, etc. For example, where opaque material 120 is a glass substrate overlaid with a mask, aperture 122 may be defined as a portion of the glass substrate not covered by the mask, such that aperture 122 is not completely hollow but rather made of glass. Thus, for instance, aperture 122 may be nearly, but not entirely, transparent to one or more wavelengths of light 102 scattered by the object 104 (e.g., glass substrates are typically not 100% transparent). Alternatively, in some examples, aperture 122 may be formed as a hollow region of opaque material 120.

In some examples, aperture 122 (in conjunction with opaque material 120) may be configured to spatially filter light 102 from the scene at the focal plane. To that end, for example, light 102 may be focused onto a focal plane along a surface of opaque material 120, and aperture 122 may allow only a portion of the focused light to be transmitted to array 110. As such, aperture 122 may behave as an optical pinhole. In one embodiment, aperture 122 may have a cross-sectional area of between 0.02 mm$^2$ and 0.06 mm$^2$ (e.g., 0.04 mm$^2$). In other embodiments, aperture 122 may have a different cross-sectional area depending on various factors such as optical characteristics of lens 130, distance to array 110, noise rejection characteristics of the light detectors in array 110, etc.

Thus, although the term "aperture" as used above with respect to aperture 122 may describe a recess or hole in an opaque material through which light may be transmitted, it is noted that the term "aperture" may include a broad array of optical features. In one example, as used throughout the description and claims, the term "aperture" may additionally encompass transparent or translucent structures defined within an opaque material through which light can be at least partially transmitted. In another example, the term "aperture" may describe a structure that otherwise selectively limits the passage of light (e.g., through reflection or refraction), such as a mirror surrounded by an opaque material. In one example embodiment, mirror arrays surrounded by an opaque material may be arranged to reflect light in a certain direction, thereby defining a reflective portion, which may be referred to as an "aperture".

Although aperture 122 is shown to have a rectangular shape, it is noted that aperture 122 can have a different shape, such as a round shape, circular shape, elliptical shape, among others. In some examples, aperture 122 can alternatively have an irregular shape specifically designed to account for optical aberrations within system 100. For example, a keyhole shaped aperture may assist in accounting for parallax occurring between an emitter (e.g., light source that emits light 102) and a receiver (e.g., lens 130 and array 110). The parallax may occur if the emitter and the receiver are not located at the same position, for example. Other irregular aperture shapes are also possible, such as specifically shaped apertures that correspond with particular objects expected to be within a particular scene or irregular apertures that select specific polarizations of light 102 (e.g., horizontal or vertical polarizations).

Lens 130 may focus light 102 from the scene onto the focal plane where aperture 122 is positioned. With this arrangement, the light intensity collected from the scene, at lens 130, may be focused to have a reduced cross-sectional area over which light 102 is projected (i.e., increasing the spatial power density of light 102). For example, lens 130 may include a converging lens, a biconvex lens, and/or a spherical lens, among other examples. Alternatively, lens 130 can be implemented as a consecutive set of lenses positioned one after another (e.g., a biconvex lens that focuses light in a first direction and an additional biconvex lens that focuses light in a second direction). Other types of lenses and/or lens arrangements are also possible. In addition, system 100 may include other optical elements (e.g., mirrors, etc.) positioned near lens 130 to aid in focusing light 102 incident on lens 130 onto opaque material 120.

Object 104 may be any object positioned within a scene surrounding system 100. In implementations where system 100 is included in a LIDAR device, object 104 may be illuminated by a LIDAR transmitter that emits light (a portion of which may return as light 102). In example embodiments where the LIDAR device is used for navigation on an autonomous vehicle, object 104 may be or include pedestrians, other vehicles, obstacles (e.g., trees, debris, etc.), or road signs, among others.

As noted above, light 102 may be reflected or scattered by object 104, focused by lens 130, transmitted through aperture 122 in opaque material 120, and measured by light detectors in array 110. This sequence may occur (e.g., in a LIDAR device) to determine information about object 104.

In some embodiments, light 102 measured by array 110 may additionally or alternatively include light scattered off multiple objects, transmitted by a transmitter of another LIDAR device, ambient light, sunlight, among other possibilities.

In addition, the wavelength(s) of light 102 used to analyze object 104 may be selected based on the types of objects expected to be within a scene and their expected distance from lens 130. For example, if an object expected to be within the scene absorbs all incoming light of 500 nm wavelength, a wavelength other than 500 nm may be selected to illuminate object 104 and to be analyzed by system 100. The wavelength of light 102 (e.g., if transmitted by a transmitter of a LIDAR device) may be associated with a source that generates light 102 (or a portion thereof). For example, if the light is generated by a laser diode, light 102 may comprise light within a wavelength range that includes 900 nm (or other infrared and/or visible wavelength). Thus, various types of light sources are possible for generating light 102 (e.g., an optical fiber amplifier, various types of lasers, a broadband source with a filter, etc.).

Figure 1B:
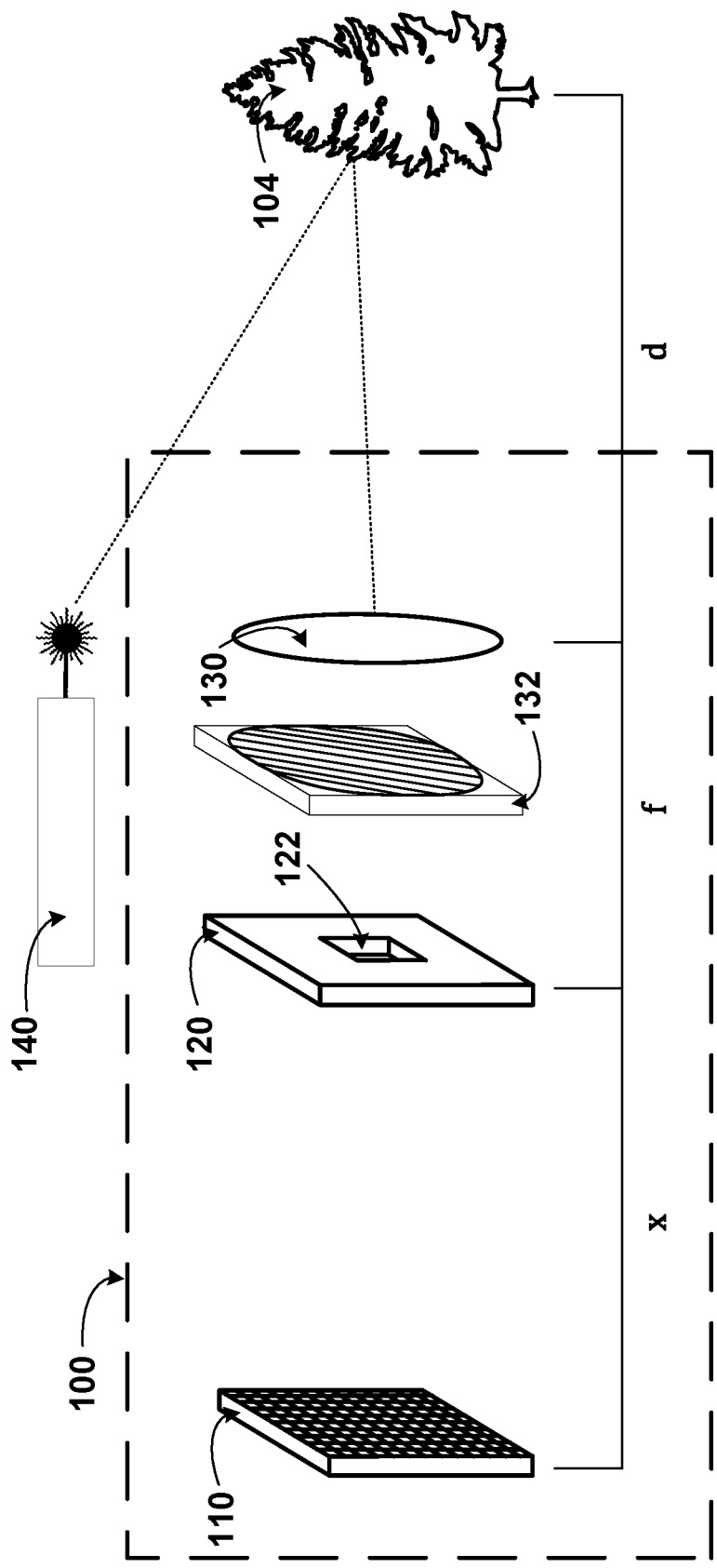
FIG. 1B is another illustration of the system of FIG. 1A.

FIG. 1B is another illustration of system 100. As shown, system 100 may also include a filter 132. Filter 132 may include any optical filter configured to selectively transmit light within a predefined wavelength range. For example, filter 132 can be configured to selectively transmit light within a visible wavelength range, an infrared wavelength range, or any other wavelength range of the light signal emitted by emitter 140. For example, optical filter 132 may be configured to attenuate light of particular wavelengths or divert light of particular wavelengths away from the array 110. For instance, optical filter 132 may attenuate or divert wavelengths of light 102 that are outside of the wavelength range emitted by emitter 140. Therefore, optical filter 132 may, at least partially, reduce ambient light or background light from adversely affecting measurements by array 110.

In various embodiments, optical filter 132 may be located in various positions relative to array 110. As shown, optical filter 132 is located between lens 130 and opaque material 120. However, optical filter 132 may alternatively be located between lens 130 and object 104, between opaque material 120 and array 110, combined with array 110 (e.g., array 110 may have a surface screen that optical filter 132, or each of the light detectors in array 110 may individually be covered by a separate optical filter, etc.), combined with aperture 122 (e.g., aperture 122 may be transparent only to a particular wavelength range, etc.), or combined with lens 130 (e.g., surface screen disposed on lens 130, material of lens 130 transparent only to a particular wavelength range, etc.), among other possibilities.

Further, as shown in FIG. 1B, system 100 could be used with an emitter 140 that emits a light signal to be measured by array 110. Emitter 140 may include a laser diode, fiber laser, a light-emitting diode, a laser bar, a nanostack diode bar, a filament, a LIDAR transmitter, or any other light source. As shown, emitter 140 may emit light which is scattered by object 104 in the scene and ultimately measured (at least a portion thereof) by array 110. In some embodiments, emitter 140 may be implemented as a pulsed laser (as opposed to a continuous wave laser), allowing for increased peak power while maintaining an equivalent continuous power output.

The following is a mathematical illustration comparing the amount of background light that is received by lens 130 to the amount of signal light that is detected by the array 110. As shown, the distance between object 104 and lens 130 is 'd', the distance between lens 130 and opaque material 120 is 'f', and the distance between the opaque material 120 and the array 110 is 'x'. As noted above, material 120 and aperture 122 may be positioned at the focal plane of lens 130 (i.e., 'f' may be equivalent to the focal length). Further, as shown, emitter 140 is located at a distance 'd' from object 104.

For the sake of example, it is assumed that object 104 is fully illuminated by sunlight at normal incidence, where the sunlight represents a background light source. Further, it is assumed that all the light that illuminates object 104 is scattered according to Lambert's cosine law. In addition, it is assumed that all of the light (both background and signal) that reaches array 110 is fully detected by array 110.

The power of the signal, emitted by emitter 140, that reaches aperture 122, and thus array 110, can be calculated using the following:

$$P_{signal} = P_{tx} \times \Gamma \times \frac{A_{lens}}{\pi d^2}$$

where $P_{signal}$ represents the radiant flux (e.g., in W) of the optical signal emitted by emitter 140 that reaches array 110, $P_{tx}$ represents the power (e.g., in W) transmitted by emitter 140, $\Gamma$ represents the reflectivity of object 104 (e.g., taking into account Lambert's Cosine Law), and $A_{lens}$ represents the cross-sectional area of lens 130.

The background light that reaches lens 130 can be calculated as follows:

$$\overline{P}_{background} = \frac{\overline{P}_{sun} \times T_{filter}}{\pi}$$

where $\overline{P}_{background}$ represents the radiance (e.g., in $$\frac{W}{m^2 \cdot sr})$$

of the background light (caused by sunlight scattering off object 104) arriving on lens 130 that is within a wavelength band that will be selectively passed by filter 132, $\overline{P}_{sun}$ represents the irradiance (e.g., in $$\frac{W}{m^2})$$

density due to the sun (i.e., the background source), and $T_{filter}$ represents the transmission coefficient of filter 132 (e.g., a bandpass optical filter). The factor of $1/\pi$ relates to the assumption of Lambertian scattering off of object 104 from normal incidence.

Aperture 122 reduces the amount of background light permitted to be transmitted to the array 110. To calculate the power of the background light that reaches array 110, after being transmitted through aperture 122, the area of aperture 122 is taken into account. The cross-sectional area ($A_{aperture}$) of aperture 122 can be calculated as follows:

$$A_{aperture} = w \times h$$

where $A_{aperture}$ represents the surface area of aperture 122 relative to object 104, and w and h represent the width and height (or length) of aperture 122, respectively. In addition, if lens 130 is a circular lens, the cross-sectional area ($A_{lens}$) of lens 130 can be calculated as follows:

$$A_{lens} = \pi \left(\frac{d_{lens}}{2}\right)^2$$

where $d_{lens}$ represents the diameter of the lens.

Thus, the background power transmitted to array 110 through aperture 122 can be calculated as follows:

$$P_{background} = \overline{P}_{background} \times \frac{A_{aperture}}{f^2} \times A_{lens}$$

$$\frac{A_{aperture}}{f^2}$$

represents the where $P_{background}$ represents background power incident on array 110, and acceptance solid angle in steradians. The above formula indicates that $P_{background}$ is the amount of radiance in the background signal after being reduced by lens 130 and aperture 122.

Substituting the above determined values in for $\overline{P}_{background}$, $A_{aperture}$, and $A_{lens}$ the following can be derived:

$$P_{background} = \left(\frac{\overline{P}_{sun}T_{filter}}{\pi}\right) \times \left(\frac{wh}{f^2}\right) \times \left(\pi\left(\frac{d_{lens}}{2}\right)^2\right) = \overline{P}_{sun}T_{filter}wh\frac{d^2_{lens}}{4f^2}$$

Additionally, the quantity $$F = \frac{f}{d_{lens}}$$

may be referred to as the "F number" of lens 130. Thus, with one more substitution, the following can be deduced as the background power:

$$P_{background} = \frac{\overline{P}_{sun}T_{filter}wh}{4F^2}$$

Making similar substitutions, the following can be deduced for signal power transmitted from the emitter 140 that arrives at the array 110:

$$P_{signal} = P_{tx} \times \Gamma \times \frac{\pi\left(\frac{d_{lens}}{2}\right)^2}{\pi d^2} = \frac{P_{tx}\Gamma d^2_{lens}}{4d^2}$$

Further, a signal to noise ratio (SNR) of system 100 may be determined by comparing $P_{signal}$ with $P_{background}$. As demonstrated, the background power ($P_{background}$) may be significantly reduced with respect to the signal power due to the inclusion of aperture 122, particularly for apertures having small w and/or small h (numerator of $P_{background}$ formula above). Besides reducing aperture area, increasing the transmitted power ($P_{tx}$) by emitter 140, decreasing the transmission coefficient ($T_{filter}$) (i.e., reducing an amount of background light that gets transmitted through the filter), and increasing the reflectivity (T) of object 104 may be ways of increasing the SNR. Further, it is noted that in implementations where emitter 140 emits a pulsed signal, the shot noise of the background, as opposed to the power of the background, may be primarily relevant when computing the SNR. Thus, in some implementations, the SNR can be alternatively computed by comparing the shot noise against the signal power.

As shown in FIG. 1A, light 102 diverges as it propagates away from aperture 122. Due to the divergence, a detection area at array 110 (e.g., shown as shaded area illuminated by light 102) may be larger than a cross-sectional area of aperture 122. An increased detection area (e.g., measured in m²) for a given light power (e.g., measured in W) may lead to a reduced light intensity (e.g., measured in $$\frac{W}{m^2}$$

incident on array 110.

The reduction in light intensity may be particularly beneficial in embodiments where array 110 includes SPADs or other light detectors having high sensitivities. For example, SPADs derive their sensitivity from a large reverse-bias voltage that produces avalanche breakdown within a semiconductor. This avalanche breakdown can be triggered by the absorption of a single photon, for example. Once a SPAD absorbs a single photon and the avalanche breakdown begins, the SPAD cannot detect additional photons until the SPAD is quenched (e.g., by restoring the reverse-bias voltage). The time until the SPAD is quenched may be referred to as the recovery time. If additional photons are arriving at time intervals approaching the recovery time (e.g., within a factor of ten), the SPAD may begin to saturate, and the measurements by the SPAD may thus become less reliable. By reducing the light power incident on any individual light detector (e.g., SPAD) within array 110, the light detectors (e.g., SPADs) in array 110 may remain unsaturated. As a result, the light measurements by each individual SPAD may have an increased accuracy.

Figure 2A:
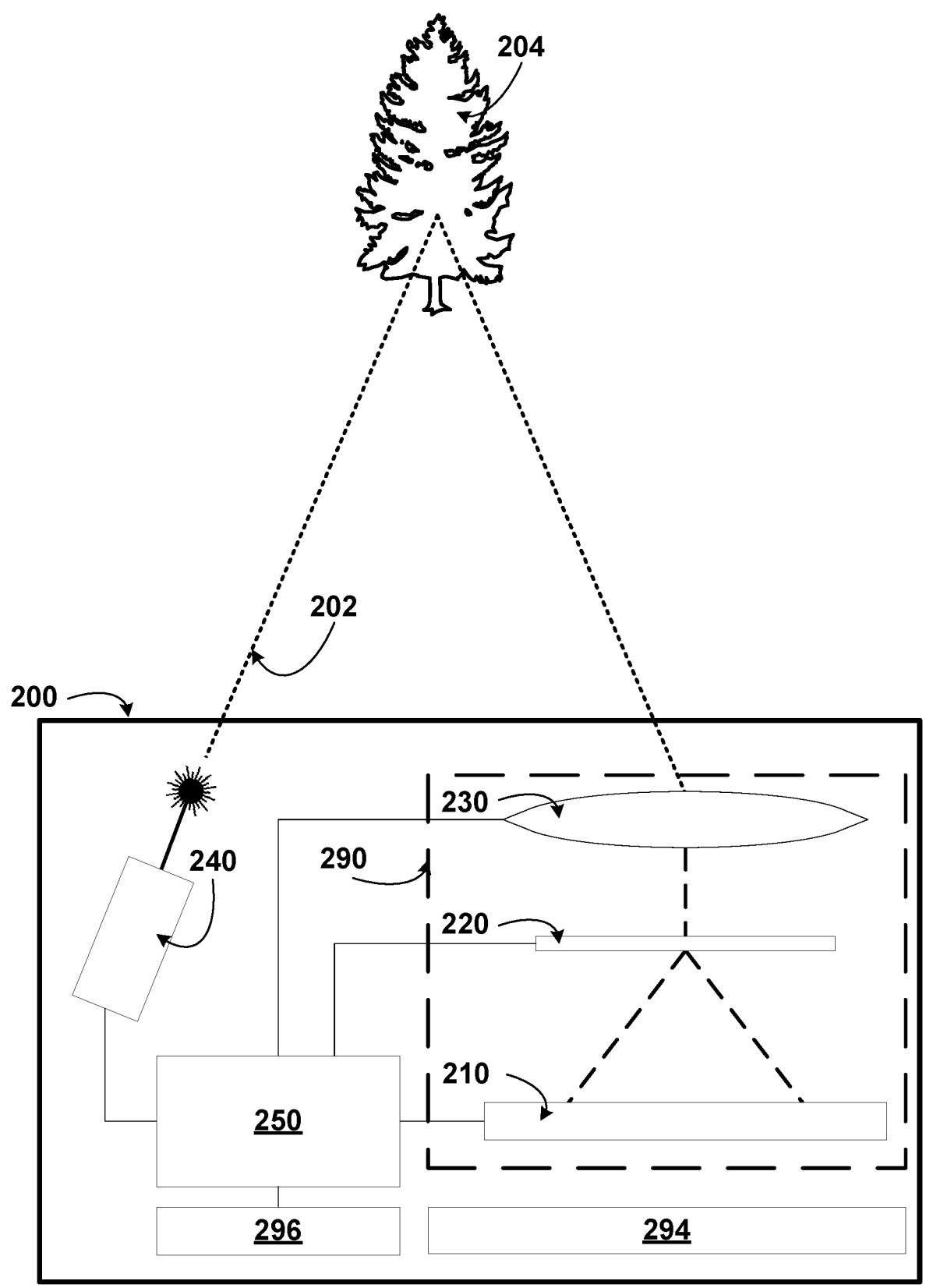
FIG. 2A is a simplified block diagram of a LIDAR device, according to example embodiments.

FIG. 2A is a simplified block diagram of a LIDAR device 200, according to example embodiments. In some example embodiments, LIDAR device 200 can be mounted to a vehicle and employed to map a surrounding environment (e.g., the scene including object 204, etc.) of the vehicle. As shown, LIDAR device 200 includes a laser emitter 240 that may be similar to emitter 140, a controller 250, and a noise limiting system 290 that may be similar to system 100, a rotating platform 294, and one or more actuators 296. In this example, system 290 includes an array 210 of light detectors, an opaque material 220 with an aperture defined therein (not shown), and a lens 230, which can be similar, respectively, to array 110, opaque material 120, and lens 130. It is noted that LIDAR device 200 may alternatively include more or fewer components than those shown. For example, LIDAR device 200 may include an optical filter (e.g., filter 132). Thus, system 290 can be implemented similarly to system 100 and/or any other noise limiting system described herein. Device 200 may operate emitter 240 to emit light 202 toward a scene that includes object 204, which may be similar, respectively, to emitter 140, light 102, and object 104. Device 200 may then detect scattered light 202 to map or otherwise determine information about object 204.

Controller 250 may be configured to control components of LIDAR device 200 and to analyze signals received from components of LIDAR device 200 (e.g., array 210 of light detectors). To that end, controller 250 may include one or more processors (e.g., a microprocessor, etc.) that execute instructions stored in a memory (not shown) of device 200 to operate device 200. Additionally or alternatively, controller 250 may include digital or analog circuitry wired to perform one or more of the various functions described herein.

Rotating platform 294 may be configured to rotate about an axis to adjust a pointing direction of LIDAR 200 (e.g., direction of emitted light 202 relative to the environment, etc.). To that end, rotating platform 294 can be formed from any solid material suitable for supporting one or more components of LIDAR 200. For example, system 290 (and/or emitter 240) may be supported (directly or indirectly) by rotating platform 294 such that each of these components moves relative to the environment while remaining in a particular relative arrangement in response to rotation of rotating platform 294. In particular, the mounted components could be rotated (simultaneously) about an axis so that LIDAR 200 may adjust its pointing direction while scanning the surrounding environment. In this manner, a pointing direction of LIDAR 200 can be adjusted horizontally by actuating rotating platform 294 to different directions about the axis of rotation. In one example, LIDAR 200 can be mounted on a vehicle, and rotating platform 294 can be rotated to scan regions of the surrounding environment at various directions from the vehicle.

In order to rotate platform 294 in this manner, one or more actuators 296 may actuate rotating platform 294. To that end, actuators 296 may include motors, pneumatic actuators, hydraulic pistons, and/or piezoelectric actuators, among other possibilities.

With this arrangement, controller 250 could operate actuator(s) 296 to rotate rotating platform 294 in various ways so as to obtain information about the environment. In one example, rotating platform 294 could be rotated in either direction about an axis. In another example, rotating platform 294 may carry out complete revolutions about the axis such that LIDAR 200 scans a 360° field-of-view (FOV) of the environment. In yet another example, rotating platform 294 can be rotated within a particular range (e.g., by repeatedly rotating from a first angular position about the axis to a second angular position and back to the first angular position, etc.) to scan a narrower FOV of the environment. Other examples are possible.

Moreover, rotating platform 294 could be rotated at various frequencies so as to cause LIDAR 200 to scan the environment at various refresh rates. In one embodiment, LIDAR 200 may be configured to have a refresh rate of 10 Hz. For example, where LIDAR 200 is configured to scan a 360° FOV, actuator(s) 296 may rotate platform 294 for ten complete rotations per second.

Figure 2B:
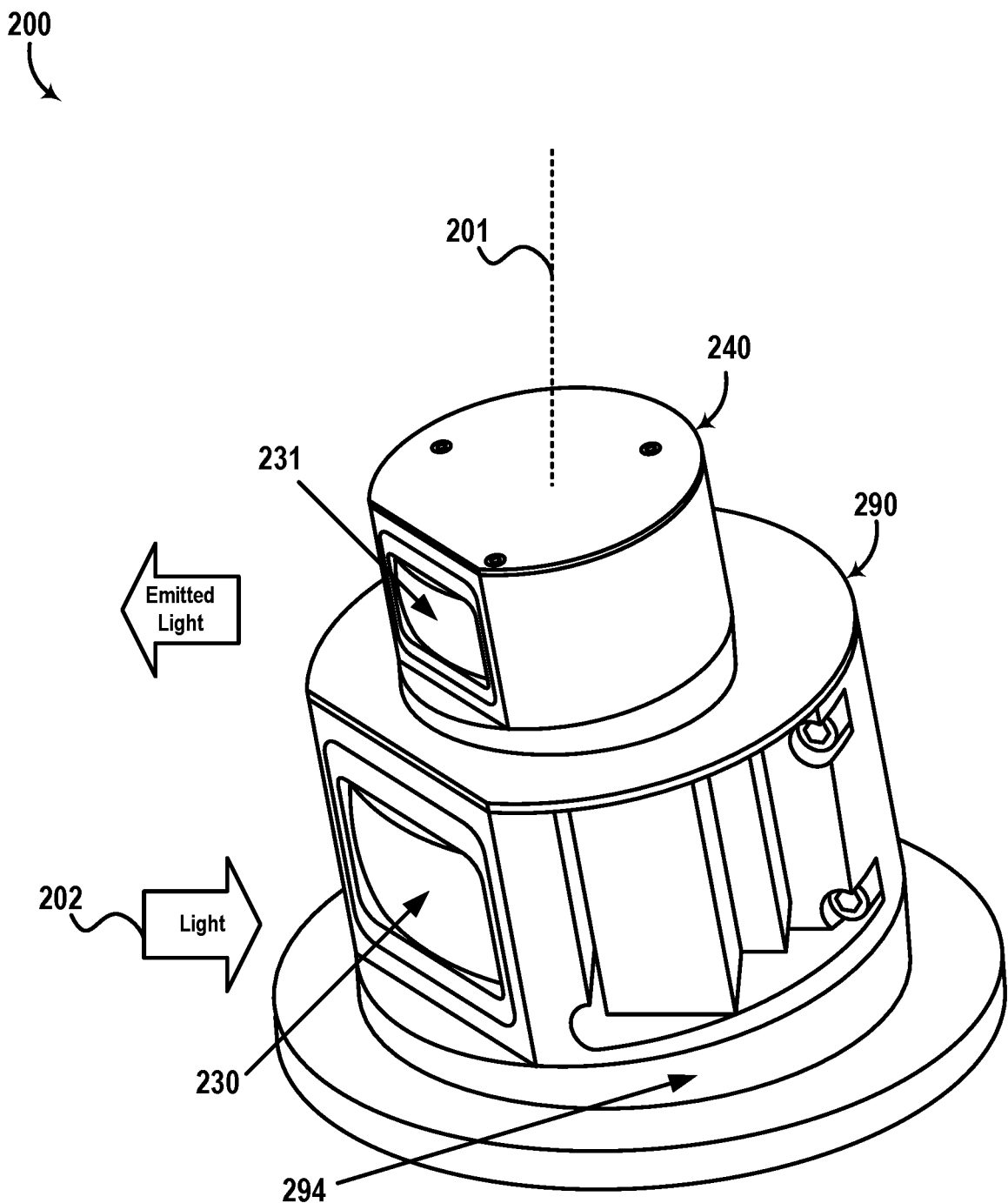
FIG. 2B illustrates a perspective view of the LIDAR device of FIG. 2A.

FIG. 2B illustrates a perspective view of LIDAR device 200. As shown, device 200 also includes a transmitter lens 231 that directs emitted light from emitter 240 toward the environment of device 200.

To that end, FIG. 2B illustrates an example implementation of device 200 where emitter 240 and system 290 each have separate respective optical lenses 231 and 230. However, in other embodiments, device 200 can be alternatively configured to have a single shared lens for both emitter 240 and system 290. By using a shared lens to both direct the emitted light and receive the incident light (e.g., light 202), advantages with respect to size, cost, and/or complexity can be provided. For example, with a shared lens arrangement, device 200 can mitigate parallax associated with transmitting light (by emitter 240) from a different viewpoint than a viewpoint from which light 202 is received (by system 290).

As shown in FIG. 2B, light beams emitted by emitter 240 propagate from lens 231 along a pointing direction of LIDAR 200 toward an environment of LIDAR 200, and may then reflect off one or more objects in the environment as light 202. LIDAR 200 may then receive reflected light 202 (e.g., through lens 230) and provide data pertaining to the one or more objects (e.g., distance between the one or more objects and the LIDAR 200, etc.).

Further, as shown in FIG. 2B, rotating platform 294 mounts system 290 and emitter 240 in the particular relative arrangement shown. By way of example, if rotating platform 294 rotates about axis 201, the pointing directions of system 290 and emitter 240 may simultaneously change according to the particular relative arrangement shown. Through this process, LIDAR 200 can scan different regions of the surrounding environment according to different pointing directions of LIDAR 200 about axis 201. Thus, for instance, device 200 (and/or another computing system) can determine a three-dimensional map of a 360° (or less) view of the environment of device 200 by processing data associated with different pointing directions of LIDAR 200 about axis 201.

In some examples, axis 201 may be substantially vertical. In these examples, the pointing direction of device 200 can be adjusted horizontally by rotating system 290 (and emitter 240) about axis 201.

In some examples, system 290 (and emitter 240) can be tilted (relative to axis 201) to adjust the vertical extents of the FOV of LIDAR 200. By way of example, LIDAR device 200 can be mounted on top of a vehicle. In this example, system 290 (and emitter 240) can be tilted (e.g., toward the vehicle) to collect more data points from regions of the environment that are closer to a driving surface on which the vehicle is located than data points from regions of the environment that are above the vehicle. Other mounting positions, tilting configurations, and/or applications of LIDAR device 200 are possible as well (e.g., on a different side of the vehicle, on a robotic device, or on any other mounting surface).

It is noted that the shapes, positions, and sizes of the various components of device 200 can vary, and are illustrated as shown in FIG. 2B only for the sake of example.

Returning now to FIG. 2A, in some implementations, controller 250 may use timing information associated with a signal measured by array 210 to determine a location (e.g., distance from LIDAR device 200) of object 204. For example, in embodiments where laser emitter 240 is a pulsed laser, controller 250 can monitor timings of output light pulses and compare those timings with timings of signal pulses measured by array 210. For instance, controller 250 can estimate a distance between device 200 and object 204 based on the speed of light and the time of travel of the light pulse (which can be calculated by comparing the timings). In one implementation, during the rotation of platform 294, emitter 240 may emit light pulses (e.g., light 202), and system 290 may detect reflections of the emitted light pulses. Device 200 (or another computer system that processes data from device 200) can then generate a three-dimensional (3D) representation of the scanned environment based on a comparison of one or more characteristics (e.g., timing, pulse length, light intensity, etc.) of the emitted light pulses and the detected reflections thereof.

In some implementations, controller 250 may be configured to account for parallax (e.g., due to laser emitter 240 and lens 230 not being located at the same location in space). By accounting for the parallax, controller 250 can improve accuracy of the comparison between the timing of the output light pulses and the timing of the signal pulses measured by the array 210.

In some implementations, controller 250 could modulate light 202 emitted by emitter 240. For example, controller 250 could change the projection (e.g., pointing) direction of emitter 240 (e.g., by actuating a mechanical stage, such as platform 294 for instance, that mounts emitter 240). As another example, controller 250 could modulate the timing, the power, or the wavelength of light 202 emitted by emitter 240. In some implementations, controller 250 may also control other operational aspects of device 200, such as adding or removing filters (e.g., filter 132) along a path of propagation of light 202, adjusting relative positions of various components of device 200 (e.g., array 210, opaque material 220 (and an aperture therein), lens 230, etc.), among other possibilities.

In some implementations, controller 250 could also adjust an aperture (not shown) within material 220. In some embodiments, the aperture may be selectable from a number of apertures defined within the opaque material. In such embodiments, a MEMS mirror could be located between lens 230 and opaque material 220 and may be adjustable by controller 250 to direct the focused light from lens 230 to one of the multiple apertures. In some embodiments, the various apertures may have different shapes and sizes. In still other embodiments, the aperture may be defined by an iris (or other type of diaphragm). The iris may be expanded or contracted by controller 250, for example, to control the size or shape of the aperture.

Thus, in some examples, LIDAR device 200 can modify a configuration of system 290 to obtain additional or different information about object 204 and/or the scene. In one example, controller 250 may select a larger aperture in response to a determination that background noise received by system from the scene is currently relatively low (e.g., during night-time). The larger aperture, for instance, may allow system 290 to detect a portion of light 202 that would otherwise be focused by lens 230 outside the aperture. In another example, controller 250 may select a different aperture position to intercept the portion of light 202. In yet another example, controller 250 could adjust the distance (e.g., distance 'x' shown in FIG. 1B) between an aperture and light detector array 210. By doing so, for instance, the cross-sectional area of a detection region in array 210 (i.e., cross-sectional area of light 202 at array 210) can be adjusted as well (e.g., shaded region shown in FIG. 1A).

However, in some scenarios, the extent to which the configuration of system 290 can be modified may depend on various factors such as a size of LIDAR device 200 or system 290, among other factors. For example, referring back to FIG. 1A, a size of array 110 may depend on an extent of divergence of light 102 from a location of aperture 122 to a location of array 110 (e.g., distance 'x' shown in FIG. 1B). Thus, for instance, the maximum vertical and horizontal extents of array 110 may depend on the physical space available for accommodating system 100 within a LIDAR device. Similarly, for instance, an available range of values for distance 'x' (shown in FIG. 1B) between array 110 and aperture 122 may also be limited by physical limitations of a LIDAR device where system 100 is employed.

Accordingly, example implementations are described herein for space-efficient noise limiting systems that increase a detection area in which light detectors can intercept light from the scene and reduce background noise.

Figure 3B:
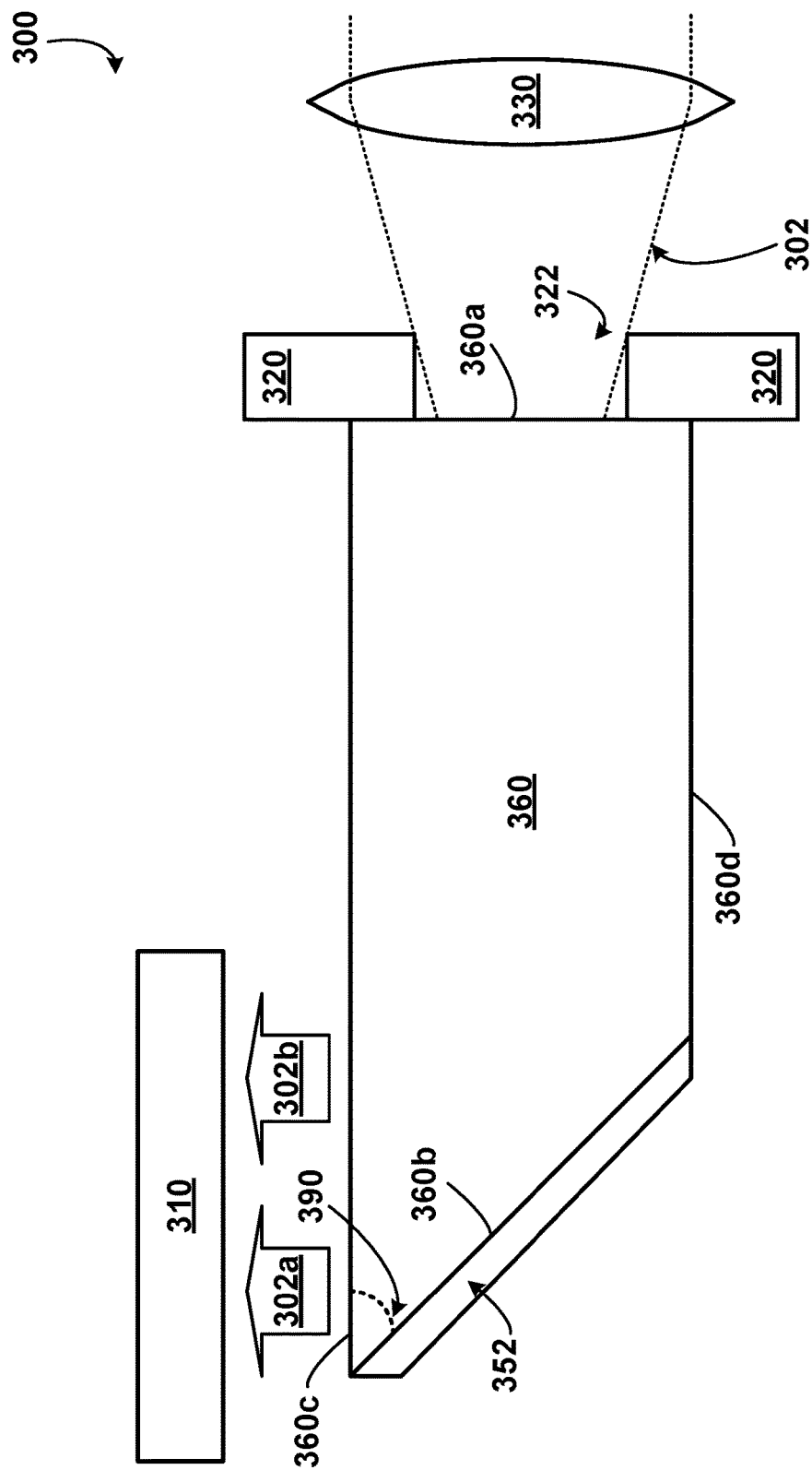
FIG. 3B illustrates a cross-section view of the system of FIG. 3A.

FIG. 3A is an illustration of a noise limiting system 300 that includes an aperture and a waveguide, according to example embodiments. FIG. 3B illustrates a cross-section view of system 300, according to example embodiments. In some implementations, system 300 can be used with device 200 instead of or in addition to system 290. As shown, system 300 may measure light 302 reflected or scattered by an object 304 within a scene similarly to, respectively, system 100, light 102, and object 104. Further, as shown, system 300 includes a light detector array 310, an opaque material 320, an aperture 322, and a lens 330 which may be similar, respectively, to array 110, material 120, aperture 122, and lens 130. For the sake of example, aperture 322 is shown to have a different shape (elliptical) compared to a shape of aperture 122 (rectangular). However, in line with the discussion above, various shapes of aperture 322 are possible. As shown, system 300 also includes a waveguide 360 (e.g., optical waveguide, etc.) arranged to receive light 302 (or a portion thereof) transmitted through aperture 322 and projected onto (e.g., shaded region) a receiving side 360a of waveguide 360. As shown, system 300 also includes a mirror 352 disposed on side 360b of waveguide 360.

Waveguide 360 can be formed from a glass substrate (e.g., glass plate, etc.), a photoresist material (e.g., SU-8, etc.), or any other material at least partially transparent to one or more wavelengths of light 302. Further, in some examples, waveguide 360 may be formed from a material that has a different index of refraction than materials surrounding waveguide 360. Thus, for example, waveguide 360 may guide light propagating therein via internal reflection (e.g., total internal reflection, etc.) at one or more edges, sides, walls, etc., of waveguide 360.

Mirror 352 may include any reflective material that has reflectivity characteristics suitable for reflecting (at least partially) wavelengths of light 302 guided in waveguide 360. To that end, a non-exhaustive list of example reflective materials includes gold, aluminum, other metal or metal oxide, synthetic polymers, hybrid pigments (e.g., fibrous clays and dyes, etc.), among other examples. As shown, mirror 352 is tilted (e.g., relative to an orientation of side 360a and/or a guiding direction of waveguide 360) at an offset angle 390 toward side 360c of waveguide 360 (i.e., angle between mirror 352 and side 360a). In general, mirror 352 is positioned along a path of at least a portion of guided light 302 propagating inside waveguide 360 (from side 360a toward side 360b). In one embodiment, as shown, mirror 352 may be disposed on side 360b of waveguide 360. For instance, side 360b can be formed to have the offset or tilting angle 390 relative to an orientation of side 360a, and mirror 352 can be disposed on side 360b (e.g., via chemical vapor deposition, sputtering, mechanical coupling, or any other deposition process). However, in other embodiments, mirror 352 can be alternatively disposed inside waveguide 360 (e.g., between sides 360a and 360b). In one embodiment, the offset or tilting angle 390 of mirror 352 is 45°. However, other offset angles are possible.

As shown, waveguide 360 may be proximally positioned and/or in contact with opaque material 320 such that light 302 transmitted through aperture 322 is received by receiving side 360a (e.g., input end) of waveguide 360. Waveguide 360 may then guide at least a portion of received light 302, via total internal reflection or frustrated total internal reflection (FTIR) for instance, inside waveguide 360 toward an output end of waveguide 360. For example, in the embodiment shown in FIGS. 3A and 3B, waveguide 360 can guide received light 302 toward side 360b opposite to side 360a.

Further, as best shown in FIG. 3B, waveguide 360 may extend vertically between sides 360c and 360d. Sides 360c and 360d may each extend between sides 360a and 360b (e.g., along a guiding direction of waveguide 360). In some examples, side 360c may correspond to an interface between a relatively high index of refraction medium (e.g., glass, photoresist, epoxy, etc.) of waveguide 360 and a relatively lower index of refraction medium (e.g., air, vacuum, optical adhesive, etc.) adjacent to side 360c (and/or one or more other sides of waveguide 360). Thus, for instance, if guided light 302 propagates to side 360c at less than the critical angle (e.g., which may be based on a ratio of indexes of refraction of the materials at side 360c, etc.), then the guided light incident on side 360c (or a portion thereof) may be reflected back into waveguide 360. Similarly, as best shown in FIG. 3A, waveguide 360 may extend horizontally between side 360e and another side of waveguide 360 (not shown) opposite to side 360e to control divergence of the guided light horizontally, for example.

Mirror 352 may reflect at least a portion of guided light 302 (guided inside waveguide 360) toward a particular region of side 360c and out of waveguide 360, as indicated by arrows 302a and 302b shown in FIG. 3B. For example, offset or tilting angle 390 of mirror 352 can be selected such that reflected light 302a, 302b from mirror 352 propagates toward the particular region of side 360c at greater than the critical angle, and reflected light 302a, 302b may thus be (at least partially) transmitted through side 360c rather than reflected (e.g., via total internal reflection etc.) back into waveguide 360. Further, light detector array 310 can be positioned adjacent to the particular region of side 360c (through which reflected light 302a, 302b is transmitted) to receive reflected light 302a, 302b.

Thus, unlike light detector array 110, light detector array 310 can be aligned (as shown in FIGS. 3A and 3B) with the guiding direction of waveguide 360 (e.g., adjacent to side 360c) to intercept and detect reflected light 302a, 302b propagating out of side 360c. With this configuration, system 300 may provide an increased detection area for intercepting light 302 while also efficiently utilizing the space behind opaque material 320.

It is noted that the sizes, positions, orientations, and shapes of the various components and features shown in FIGS. 3A and 3B are not necessarily to scale, but are illustrated as shown for convenience in description. Further, in some embodiments, system 300 may include fewer or more components than those shown. Further, in some embodiments, one or more of the components shown can be combined, or divided into separate components.

In a first embodiment, light detector array 310 can be alternatively disposed (e.g., molded, etc.) on side 360c.

In a second embodiment, a distance between waveguide 360 and aperture 322 can vary. In one example, as shown in FIGS. 3A and 3B, waveguide 360 can be disposed along (e.g., in contact with, etc.) opaque material 320. Thus, for instance, side 360a (i.e., input end of waveguide 360) can be substantially coplanar with or proximal to aperture 322. With this arrangement for instance, waveguide 360 can receive and guide light 302 prior to divergence of light 302 transmitted through aperture 302. However, in other examples, waveguide 360 can be alternatively positioned at a distance (e.g., gap) from opaque material 320 (and aperture 322). For instance, an optical adhesive can be used to couple opaque material 320 with waveguide 360.

In a third embodiment, the arrangement of aperture 322 (and/or side 360a of waveguide 360) relative to lens 330 can vary. In one example, aperture 322 (and/or an input end of waveguide 360) can be disposed along the focal plane of lens 330. In another example, aperture 322 (and/or an input end of waveguide 360) can be disposed parallel to the focal plane of lens 330 but at a different distance to lens 330 than the distance between the focal plane and lens 330. Thus, in this example, optical characteristics (e.g., focus configuration, etc.) of system 300 can be adjusted depending on an application of system 300. As such, in some instances, focused light 302 may continue converging (after transmission through aperture 322) inside waveguide 360 before beginning to diverge toward side 360b. In some instances, system 300 may also include an actuator that moves lens 330, opaque material 320, and/or waveguide 360 to achieve a particular optical configuration while scanning the scene. In yet another example, aperture 322 (and/or side 360a of waveguide 360) can be arranged at an offset orientation relative to the focal plane of lens 330. For instance, system 300 can rotate (e.g., via an actuator) opaque material 320 (and/or array 360) to adjust the entry angle of light 302 into waveguide 360. By doing so, a controller (e.g., controller 250) can further control optical characteristics of system 300 depending on various factors such as lens characteristics of lens 330, environment of system 300 (e.g., to reduce noise/interference arriving from a particular region of the scanned scene, etc.), among other factors.

In a fourth embodiment, material 320 can be omitted and side 360a can be alternatively positioned along or parallel to the focal plane of lens 330. In this embodiment, side 360a may thus correspond to an aperture.

In a fifth embodiment, the light detectors in array 310 can be alternatively implemented as separate physical structures coupled (e.g., disposed on or molded to, etc.) to waveguide 360.

In a sixth embodiment, light detector array 310 can be implemented to alternatively or additionally overlap other sides of waveguide 360 (e.g., side 360e, side 360d, etc.). Thus, in this embodiment, the light detectors in array 310 can detect light propagating out of waveguide 360 over a greater detection area.

In a seventh embodiment, waveguide 360 can alternatively have a cylindrical shape, such as an optical fiber, or any other shape. In this embodiment, the light detectors in array 310 can be alternatively arranged to surround (at least partially) an outer surface of the optical fiber to receive reflected light 302a, 302b propagating out of the cylindrical outer surface of the optical fiber. Thus, in some examples, waveguide 360 can be implemented as a rigid structure (e.g., slab waveguide) or as a flexible structure (e.g., optical fiber). For example, waveguide 360 can be alternatively configured as a waveguide diffuser that diffuses light 302 (or a portion thereof) transmitted through aperture 322 toward a detection area that can have various shapes or positions, as opposed to a flat surface (e.g., shaded region shown in FIG. 1A) orthogonal to a direction of propagation of diverging light 102.

Figure 4A:
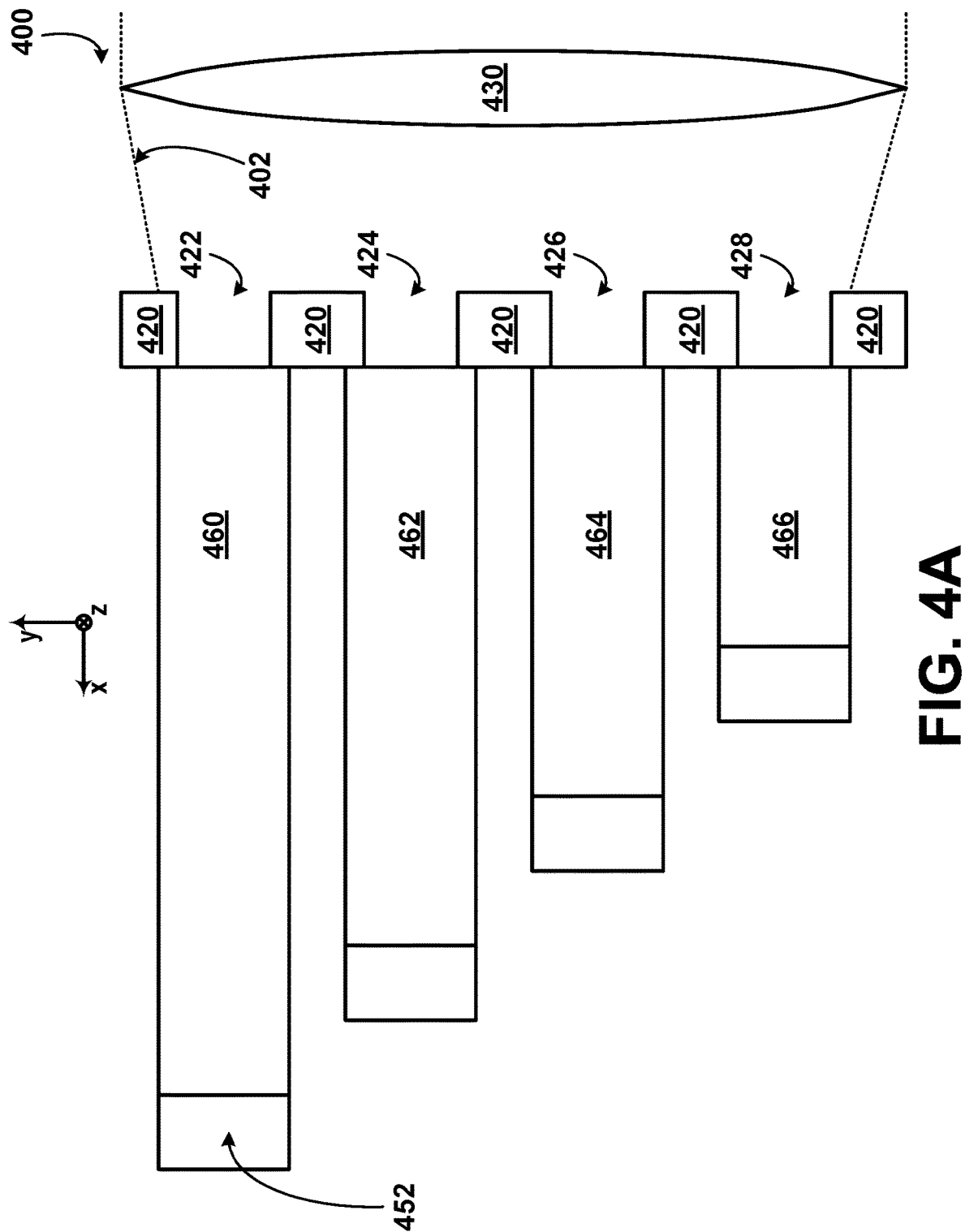
FIG. 4A illustrates a partial top view of a noise limiting system that includes multiple waveguides, according to example embodiments.

FIG. 4A illustrates a partial top view of a noise limiting system 400 that includes multiple waveguides 460, 462, 464, 466, according to example embodiments. It is noted that some of the components of system 400, such as light detectors, etc., are omitted from the illustration of FIG. 4A for convenience in description. For purposes of illustration, FIG. 4A shows an x-y-z axis, in which the z-axis is pointing out of the page.

System 400 may be similar to any of systems 100, 290, and/or 300, and can be used instead of or in addition to system 290 of device 200. As shown, system 400 includes an opaque material 420 and a lens 430 that may be similar, respectively, to opaque material 320 and lens 330. Further, as shown, system 400 includes multiple waveguides 460, 462, 464, 466, each of which may be similar to waveguide 360.

Lens 430 may focus light 402 from a scene onto opaque material 420, similarly to lens 330, light 302, and opaque material 320 of system 300, for example. However, unlike system 300, opaque material 420 may define multiple apertures 422, 424, 426, 428 that are respectively aligned with (e.g., adjacent to) waveguides 460, 462, 464, 466. Thus, with this arrangement, system 400 may be configured to simultaneously capture light portions from multiple regions of focused light 402 projected by lens 430 on opaque material 420 at the respective positions of apertures 422, 424, 426, 428. Each light portion can be guided by a respective one of waveguides 460, 462, 464, 466 onto a respective array of light detectors having a larger cross-sectional detection area than a cross-sectional area of a corresponding aperture. Through this process, for instance, system 400 can capture a 1D image of the scanned scene by defining multiple receive channels in a horizontal arrangement (e.g., in the x-y plane) along the focal plane of lens 430.

Further, as shown, each waveguide of waveguides 460, 462, 464, 466 may have a different length between a respective input end adjacent to opaque material 420 and a respective opposite output end (e.g., similar to side 360*b*, etc.) of the respective waveguide. With this arrangement for instance, system 400 may allow efficient use of space where respective arrays of light detectors can be placed for each of waveguides 460, 462, 464, 466.

Although FIG. 4A shows four waveguides 460, 462, 464, 466, system 400 may alternatively include fewer or more waveguides (and therefore a different number of receive channels). In one embodiment, system 400 may include 64 waveguides horizontally arranged (e.g., in the x-y plane) adjacent opaque material 420. Other waveguide arrangements are possible as well. Additionally, it is noted that the various sizes, shapes, and positions (e.g., distance between adjacent waveguides, etc.) shown for the various components of system 400 is not necessarily to scale but is illustrated as shown only for convenience in description.

Figure 4B:
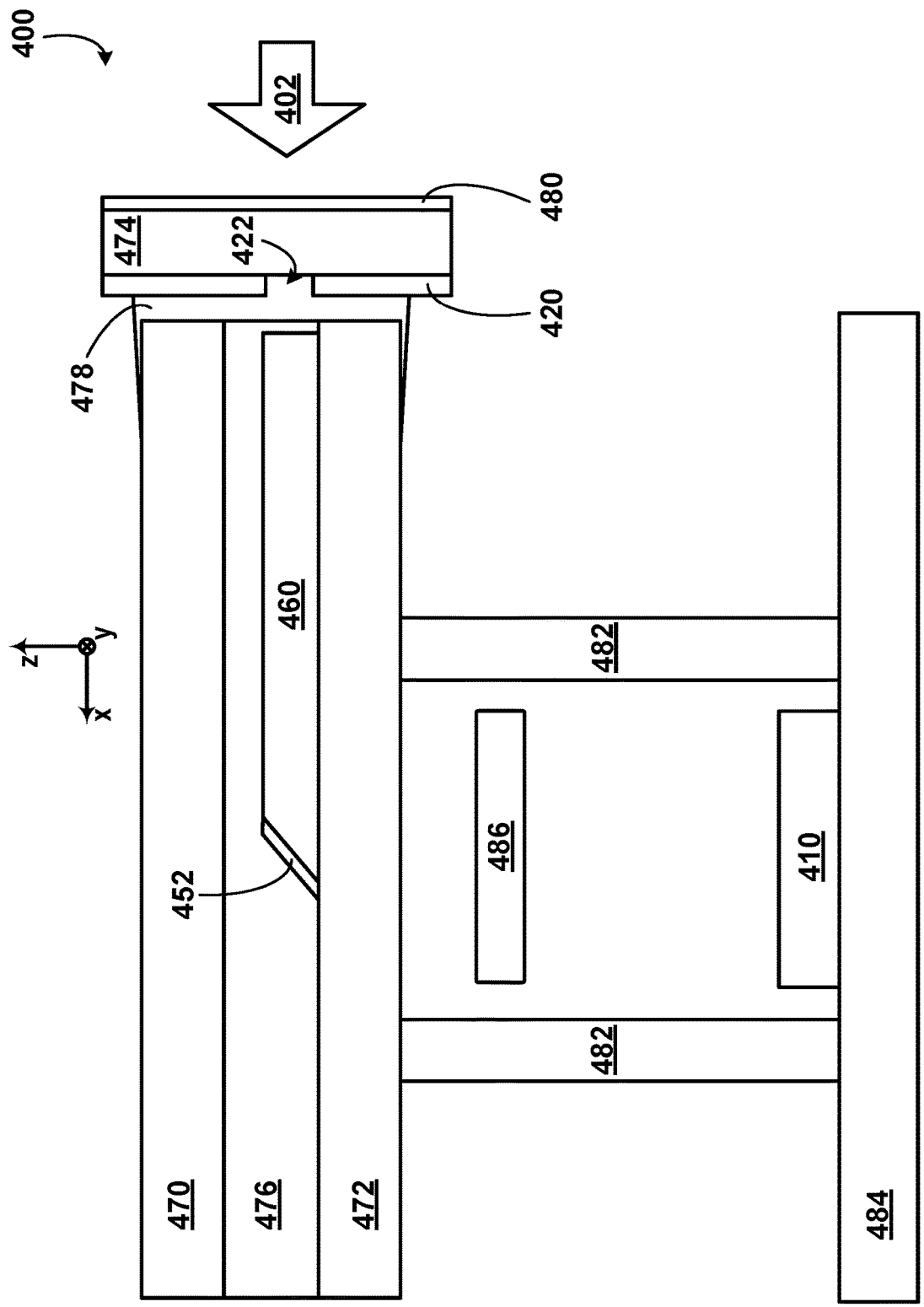
FIG. 4B illustrates a cross-section view of the system of FIG. 4A.

FIG. 4B illustrates a cross-section view of system 400 of FIG. 4A. In the cross-section view illustrated in FIG. 4B the y-axis extends through the page. It is noted that some of the components of system 400, such as lens 430 for instance, are omitted from the illustration of FIG. 4B for convenience in description.

As shown, system 400 also includes an array of light detectors 410, a mirror 452 (also shown in FIG. 4A), a first substrate 470, a second substrate 472, a third substrate 474, a first optical adhesive 476, a second optical adhesive 478, an optical filter 480, one or more optical shields 482, a support structure 484, and an optical element 486. Further, as shown, opaque material 420 (e.g., black carbon, etc.) defines aperture 422 adjacent to a first side of waveguide 460, similarly to, respectively, the arrangement of opaque material 320 and waveguide 360.

Array 410 and mirror 452 may be similar, respectively, to array 310 and mirror 352. For example, mirror 452 may reflect light guided inside waveguide 460 out of waveguide 460 toward array 410. For instance, as shown, mirror 452 could be disposed on a tilted side of waveguide 460 (opposite to the side adjacent to opaque material 420) to reflect the guided light toward array 410.

Substrates 470, 472, 474 can be formed from any transparent solid material configured to allow propagation of light (e.g., wavelengths of light transmitted through aperture 422, guided by waveguide 460, and/or reflected by mirror 452 toward array 410) through the respective substrates. For example, substrates 470, 472, 474 may include glass substrates.

Optical adhesives 476, 478 may be formed from any type of material that cures from a liquid form into a solid form to attach one or more components of system 400 to one another. Example optical adhesives may include photopolymers or other polymers that can transform from a clear, colorless, liquid form into a solid form (e.g., in response to exposure to ultraviolet light or other energy source).

As shown, adhesive 476 may be disposed between substrates 470 and 472 and surrounding one or more sides of waveguide 460 to couple substrate 470 with substrate 472. With this arrangement, for instance, multiple waveguides along the x-y plane (e.g., waveguides 460, 462, 464, 466, etc.) can be supported in a particular arrangement (e.g., horizontally in the x-y plane) relative to one another. Further, as shown, adhesive 478 may be disposed between opaque material 420 and the waveguides sandwiched between substrates 470 and 472.

In an example scenario, the waveguide arrangement between substrates 470, 472 can be assembled as a "chip" that is then be diced near an edge of substrates 470, 472 without cutting through any of the "sandwiched" waveguides between the two substrates. For instance, a portion of adhesive 476 may still surround the side of waveguide 460 adjacent to opaque material 420 after the dicing. Next, in this example, the second adhesive 478 can be used to attach opaque material 420 to the waveguide sandwich arrangement. Further, for instance, adhesive 478 can be formed from a similar material as 476 (e.g., same index of refraction, etc.). As a result, light propagating through the aperture may continue propagating toward waveguide 460 in a substantially uniform optical medium (e.g., adhesives 476, 478) to reduce or prevent reflection or refraction of the light prior to reaching waveguide 460. To that end, as shown, adhesive 478 may extend through the aperture defined by opaque material 420 to couple (e.g., attach) substrate 474 to substrates 470 and 472.

Alternatively, in some embodiments, system 400 can include the sandwiched waveguide arrangement without the gap between the edge of substrates 470, 472 and the waveguides. For example, the waveguide sandwich arrangement can be formed by dicing substrates 470, 472 and the waveguides. In this example, the waveguides can be formed from a material having a sufficient hardness to mitigate damage due to the dicing. Further, in this example, the diced sides of the waveguides can optionally be polished after the dicing to improve a smoothness of the diced sides.

Optical filter 480 may include any light filter configured to attenuate light propagating toward waveguide 460. For example, where system 400 is employed in a LIDAR device, filter 480 may be configured to attenuate wavelengths of light outside a wavelength range of light emitted by a transmitter of the LIDAR device. By doing so, for instance, filter 480 may reduce an amount of ambient or background light reaching array 410, thereby improving the accuracy of measurements obtained using array 410. As shown, filter 480 may be disposed on a side of substrate 474 (opposite to the side adjacent to opaque material 420).

In another embodiment, filter 480 can be alternatively disposed on the side adjacent to opaque material 420 or at any other location along a propagation path of the light prior to arrival of the light at array 410. In yet another embodiment, substrate 474 can be formed from a material that has light filtering characteristics of filter 480. Thus, in this embodiment, filter 480 can be omitted from system 400 (i.e., the functions of filter 480 can be performed by substrate 474). In still another embodiment, filter 480 can be implemented as multiple (e.g., smaller) filters that are each disposed between substrate 474 and a respective one of the arrays of light detectors. For instance, a first filter can be used to attenuate light propagating toward array 410, and a second separate filter can be used to attenuate light propagating toward another array of light detectors (not shown), etc.

In some examples, substrate 474 (and filter 480) may extend through the page in the illustration of FIG. 4B (e.g., along the y-axis) to similarly attenuate light propagating toward waveguides 462, 464, and 466.

Optical or light shield(s) 482 may comprise one or more light absorbing materials (e.g., black carbon, black chrome, black plastic, etc.) arranged around array 410 to reduce or prevent light (other than light reflected by mirror 452) from reaching array 410. Referring back to FIG. 4A for example, one or more arrays of light detectors similar to array 410 can be disposed near one another on support structure 484. Data from each array, for instance, may correspond to a receive channel of system 400. Thus, in this example, light shield(s) 482 can prevent cross-talk between the respective receive channels by shielding each array from light intended for receipt by another nearby array. Additionally or alternatively, light shield(s) 482 may help reduce light from other sources (e.g., ambient light, etc.) from reaching array 410. Further, with this arrangement for instance, multiple arrays of light detectors can be densely packed next to one another to achieve efficient utilization of space in system 400.

For example, support structure 484 may include a printed circuit board (PCB) that mounts groups of light detectors (including array 410), where each group is separated by optical shields such as optical shield(s) 482. Alternatively or additionally, structure 484 may include any other solid material having material characteristics suitable for supporting array 410 and/or one or more other arrays of light detectors.

In some implementations, system 400 includes an optical element 486 disposed between mirror 452 and array 410. Optical element 486 may include any optical element or combination of optical elements that modify optical characteristics of the light reflected by mirror 452 toward array 410. In one example, optical element 486 includes a mixing rod or homogenizer configured to distribute the energy density of the reflected light prior to reaching array 410. This can be useful when the light reflected by mirror 452 has a non-uniform energy distribution. Further, in some instances, the light detectors in array 410 may include single photon detectors (e.g., avalanche photodiodes, etc.) that are associated with a "quenching" time period after detection of a photon. Distributing the energy of the light using optical element 486 may reduce the likelihood of a second photon reaching the same light detector during the "quenching" time period because the second photon may be directed toward a different light detector in array 410. In some examples, optical element 486 may alternatively or additionally include other types of optical elements, such as lenses, filters, etc.

Figure 4C:
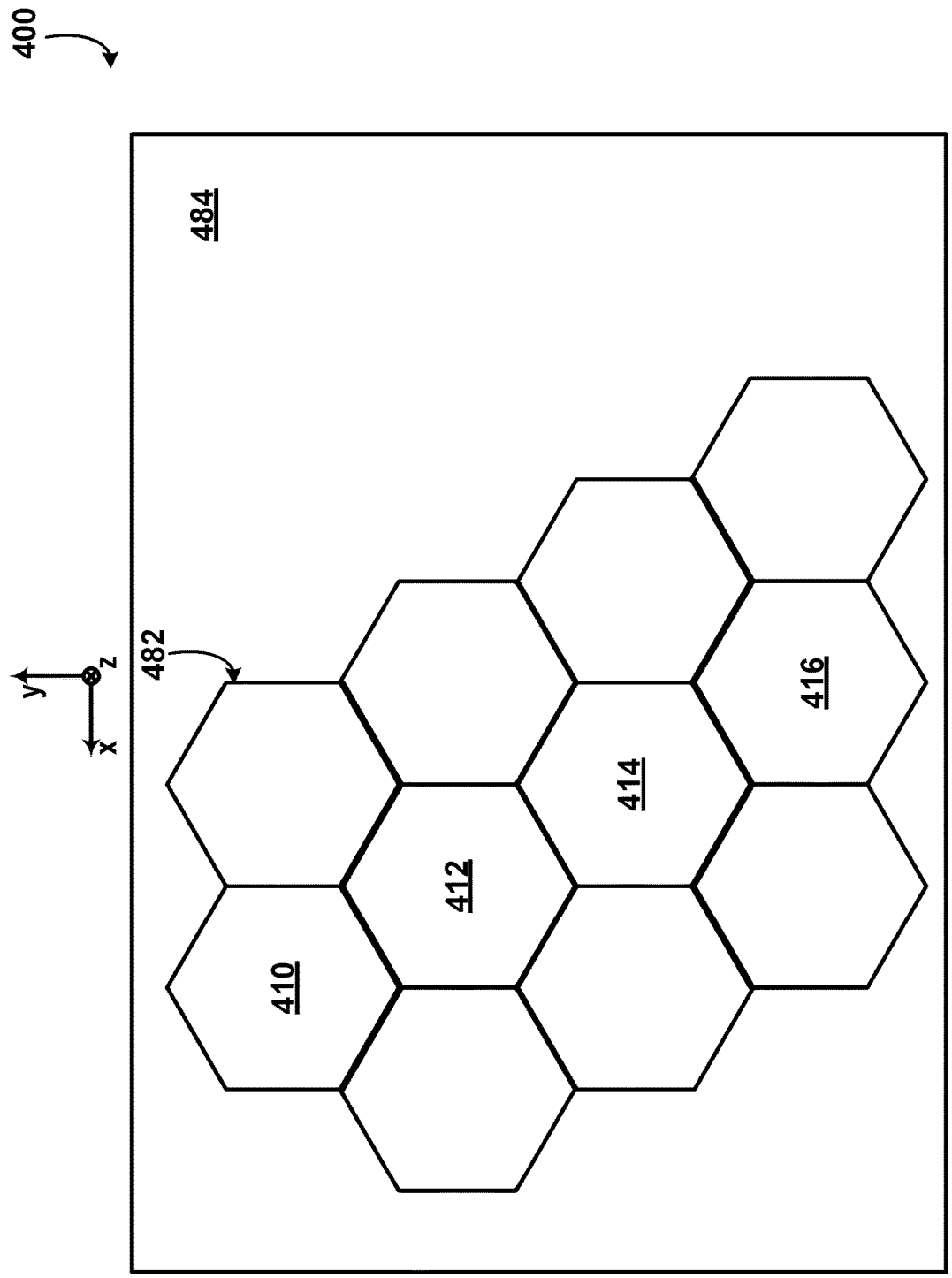
FIG. 4C illustrates another cross-section view of the system of FIG. 4A.

FIG. 4C illustrates another cross section view of system 400. In the cross section view of FIG. 4C, the surface of support structure 484 that mounts array 410 is parallel to the page (e.g., x-y plane of the x-y-z axis shown). As shown, support structure 484 mounts multiple arrays of light detectors 410, 412, 414, 418. To that end, arrays 412, 414, and 416 may include a plurality of light detectors similarly to any of arrays 310, 410, etc. For instance, each of arrays 412, 414, 416 may include a plurality of APDs (or SPADs) that are connected in parallel to one another (e.g., SiPM, MPCC, etc.). Additionally, arrays 412, 414, 418 may be aligned, respectively, with reflected light propagating out of waveguides 462, 464, 468 (shown in FIG. 4A), similarly to the alignment of array 410 with waveguide 460.

Further, as shown, light shield(s) 482 (e.g., black carbon, etc.) is arranged as a honeycomb structure, where each cell of the honeycomb structure shields a respective array of light detectors of arrays 410, 412, 414, 418. However, other arrangements of light shield(s) 482 are possible as well (e.g., rectangular cells, other shapes of cells, etc.). Thus, in some examples, this arrangement of system 400 may allow space-efficient placement of multiple arrays of light detectors (e.g., along a sign that are each aligned with a respective waveguide in system 400, while shielding light propagating toward each respective array from reaching an adjacent array.

Although not shown in FIGS. 4A-4C, system 400 may include additional waveguides that are each aligned with a different cell in the honeycomb-shaped light shield(s) 482. In one example, system 400 may include more than four waveguides that are disposed on substrate 472 (shown in FIG. 4B) similarly to waveguide 460 (e.g., an array of waveguides arranged horizontally in the x-y plane).

In another example, system 400 may include additional waveguides mounted along a different horizontal plane (e.g., disposed on substrate 470) and also aligned with respective light detector arrays (not shown) in the honeycomb-shaped light shield(s) 482. In this example, opaque material 420 may include additional apertures aligned with these additional waveguides. With this arrangement, system 400 can image additional regions of the focal plane of lens 430 to provide a two-dimensional (2D) scanned image of the scene associated with focused light 402. Alternatively or additionally, the entire assembly of system 400 can be rotated or moved to generate the 2D scanned image of the scene.

Thus, within examples, system 400 can be configured to detect light propagating through adjacent apertures (i.e., corresponding to portions of focused light 402) simultaneously over relatively larger detection areas (e.g., arrays 410, 412, 414, 416), while preventing overlap between the light from the respective adjacent apertures. By way of example, opaque material 420 may comprise a grid of apertures along the focal plane of lens 430, and each aperture in the grid may detect light from a particular portion of the FOV of lens 430. In one embodiment, opaque material 420 may comprise four rows of 64 apertures, where each row is along the y-axis shown in FIG. 4A and is separated by an offset (e.g., along z-axis) from an adjacent row of apertures. In this embodiment, system 400 may provide 4*64=256 receive channels. Other embodiments are possible as well.

Thus, system 400 may allow for multi-pixel imaging of the scene indicated by light 402 transmitted through apertures in opaque material 420, while also reducing background noise since only a small respective portion of the light (and its associated background noise) are transmitted through each respective waveguide. For example, combined outputs from light detectors in array 410 may correspond to a first pixel that indicates light transmitted through a first aperture, combined outputs from light detectors in array 412 may correspond to a second pixel that indicates light transmitted through a second aperture, combined outputs from light detectors in array 414 may correspond to a third pixel that indicates light transmitted through a third aperture, and combined outputs from light detectors in array 416 may correspond to a fourth pixel that indicates light transmitted through a fourth aperture. As such, for example, controller 250 of device 200 can compute a one-dimensional (1D) image (e.g., horizontally in the y-z plane) of the scene by combining the four (adjacent) pixels.

Although waveguides 460, 462, 464, 466 are shown in FIG. 4A to be in a horizontal (e.g., along x-y plane) arrangement, in some examples, system 400 may include waveguides in a different arrangement. In a first example, the receiving sides of the waveguides can alternatively or additionally be arranged vertically (e.g., along y-z plane) to obtain a vertical 1D image of the scene. In a second example, the receiving sides of the waveguides can alternatively be arranged both horizontally and vertically (e.g., as a two-dimensional grid) adjacent to opaque material 420. For instance, system 400 may include additional waveguides that are arranged horizontally (e.g., disposed on substrate 470 of FIG. 4B, etc.). In this instance, system 400 may similarly assemble multiple horizontal pixels based on apertures along the y-z plane (but at a different z-height (vertical location) than the apertures of waveguides 460, 462, 464, 466). Thus, in this example, controller 250 can combine outputs from the waveguides to generate a two-dimensional (2D) image of the scene (e.g., system 400 can combine horizontal pixels from multiple vertical positions on the z-axis to generate the 2D image of the scene).

In some examples, the respective apertures defined by opaque material 420 may have different sizes relative to one another. By way of example, a first aperture adjacent to waveguide 460 may have a greater size than a second aperture adjacent to waveguide 462. In this example, due to the difference between the cross-sectional areas of respective portions of light 402 incident on respective waveguides 460 and 462, light detected at array 410 may represent a larger angular field-of-view (FOV) of the scanned scene relative to an angular FOV indicated by light incident on array 412.

Alternatively or additionally, in some examples, waveguides 460, 462, 464, 466 may have different widths compared to one another. In these examples, the difference between the cross-sectional areas of the respective waveguides may similarly result in different respective angular FOVs of the scanned scene detected via the respective waveguides.

III. EXAMPLE METHODS AND COMPUTER READABLE MEDIA

Figure 5:
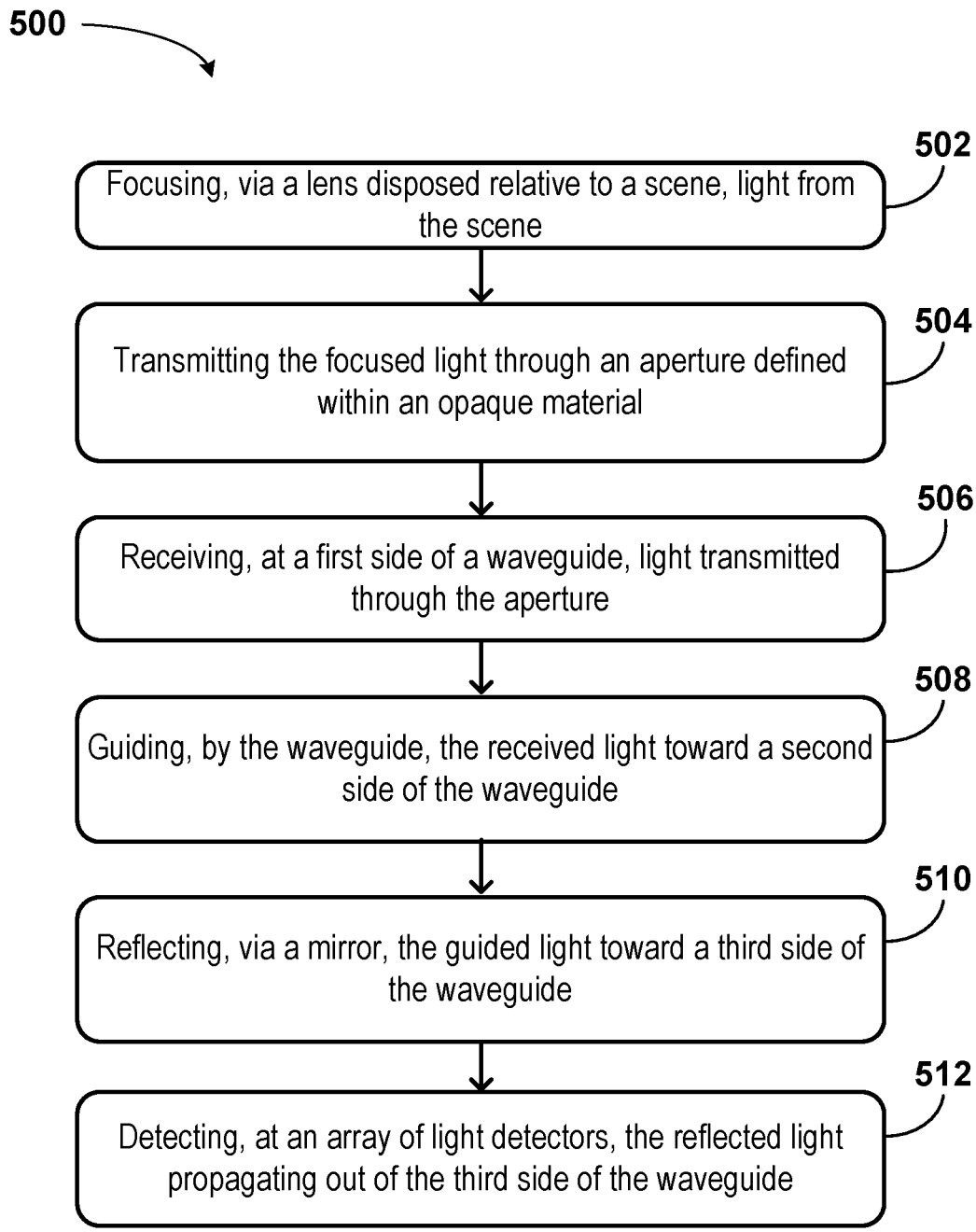
FIG. 5 is a flowchart of a method, according to example embodiments.

FIG. 5 is a flowchart of a method 500, according to example embodiments. Method 500 presents an embodiment of a method that could be used with any of systems 100, 300, 400, and/or device 200, for example. Method 500 may include one or more operations, functions, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

At block 502, method 500 involves focusing, by a lens (e.g., lens 330) disposed relative to a scene, light from the scene. In some examples, the light from the scene may be reflected or scattered by an object (e.g., object 304) within the scene. In some examples, a computing device (e.g., controller 250) may actuate or otherwise adjust a characteristic of the lens (e.g., focal plane, focal length, etc.). At block 504, method 500 involves transmitting the focused light through an aperture (e.g., aperture 322) defined within an opaque material (e.g., opaque material 320). At block 506, method 500 involves receiving, at a first side (e.g., side 360$a$) of a waveguide, at least a portion of the light transmitted through the aperture. At block 508, method 500 involves guiding, by the waveguide, the received light toward a second side of the waveguide (e.g., side 360$b$). At block 510, method 500 involves reflecting, via a mirror, the guided light toward a third side of the waveguide (e.g., side 360$c$) extending between the first side and the second side. At block 512, method 500 involves detecting, at the array of light detectors, the reflected light (e.g., 302$a$, 302$b$) propagating out of the third side of the waveguide.

In some examples, method 500 also involves combining outputs from the light detectors in the array based on the light detectors (e.g., 112, 114, etc.) in the array (e.g., 110) being connected in parallel to one another (e.g., SiPM).

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
a waveguide configured to guide light by total internal reflection or frustrated total internal reflection, wherein the waveguide has a first side configured to receive incident light into the waveguide, a second side extending from the first side, and a structure configured to direct the received incident light toward the second side;
a light detector array optically coupled to the waveguide, wherein the light detector array is configured to output a signal based on the received incident light; and
a controller, wherein the controller is configured to determine a distance to an object based on the signal output from the light detector array.

2. The system of claim 1, wherein the structure comprises a mirror.

3. The system of claim 2, wherein the mirror comprises a reflective material.

4. The system of claim 3, wherein the reflective material comprises a metal or a metal oxide.

5. The system of claim 1, wherein the structure is disposed on a side of the waveguide.

6. The system of claim 1, wherein the structure is disposed inside the waveguide.

7. The system of claim 1, wherein the received incident light directed toward the second side is transmitted to the light detector array through the second side.

8. The system of claim 7, further comprising at least one optical element disposed between the waveguide and the light detector array, wherein the at least one optical element is configured to modify optical characteristics of the received incident light transmitted to the light detector through the second side.

9. The system of claim 1, further comprising:
a light emitter, wherein the incident light comprises light emitted by the light emitter that has been reflected by the object.

10. The system of claim 1, further comprising:
a plurality of waveguides that includes the waveguide and one or more additional waveguides; and
a plurality of light detector arrays that includes the light detector array and one or more additional light detector arrays, wherein each given light detector array of the plurality of light detector arrays is optically coupled to a respective waveguide of the plurality of waveguides.

11. The system of claim 1, further comprising:
an opaque material that defines an aperture, wherein the first side is arranged to receive the incident light through the aperture.

12. The system of claim 11, further comprising:
a lens that focuses light from a scene, wherein the incident light comprises the light from the scene that has been focused by the lens and transmitted through the aperture.

13. The system of claim 1, wherein the light detector array comprises a plurality of single photon avalanche diodes (SPADs).

14. The system of claim 1, wherein the controller is configured to determine the distance to the object using timing information associated with the signal output from the light detector array.

15. A method comprising:
receiving incident light into a waveguide through a first side of the waveguide, wherein the waveguide is configured to guide light by total internal reflection or frustrated total internal reflection;
directing, by a structure disposed on or inside the waveguide, the received incident light toward a second side of the waveguide, wherein the second side extends from the first side;
detecting, by a light detector array optically coupled to the waveguide, the received incident light, wherein the detecting comprises outputting a signal from the light detector array; and
determining, by a controller, a distance to an object based on the signal output from the light detector array.

16. The method of claim 15, wherein the structure comprises a mirror.

17. The method of claim 15, wherein the received incident light directed toward the second side is transmitted to the light detector array through the second side.

18. The method of claim 15, further comprising:
emitting light by a light emitter, wherein the incident light comprises light emitted by the light emitter that has been reflected by the object.

19. The method of claim 15, further comprising:
focusing, by a lens, light from a scene; and
transmitting the focused light through an aperture, wherein the incident light comprises the light from the scene that has been focused by the lens and transmitted through the aperture.

20. The method of claim 15, wherein determining, by the controller, the distance to the object based on the signal output from the light detector array comprises:
determining, by the controller, the distance to the object using timing information associated with the signal output from the light detector array.

* * * * *